(12) United States Patent
Hongu

(10) Patent No.: US 8,724,980 B2
(45) Date of Patent: May 13, 2014

(54) LENS DRIVING APPARATUS AND CONTROL METHOD THEREOF, AND IMAGE CAPTURING APPARATUS AND CONTROL METHOD THEREOF

(75) Inventor: Hideyasu Hongu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 13/208,578

(22) Filed: Aug. 12, 2011

(65) Prior Publication Data

US 2012/0050577 A1   Mar. 1, 2012

(30) Foreign Application Priority Data

Aug. 30, 2010  (JP) ................................. 2010-192918
Jun. 21, 2011  (JP) ................................. 2011-137740

(51) Int. Cl.
*H04N 5/232* (2006.01)
*G03B 17/00* (2006.01)

(52) U.S. Cl.
USPC ............................................ 396/82; 348/347

(58) Field of Classification Search
USPC .......................................................... 396/82
See application file for complete search history.

(56) References Cited

U.S. PATENT DOCUMENTS

| | | | | |
|---|---|---|---|---|
| 5,164,756 A | * | 11/1992 | Hirasawa | ......................... 396/81 |
| 5,448,413 A | * | 9/1995 | Kobayashi et al. | ........... 359/698 |
| 5,854,948 A | | 12/1998 | Tsukada | |
| 2003/0137748 A1 | | 7/2003 | Mukaiya | |

FOREIGN PATENT DOCUMENTS

| | | | | |
|---|---|---|---|---|
| EP | 0834756 A2 | 4/1998 | | |
| EP | 1637911 A1 | 3/2006 | | |
| JP | 05236322 A | * | 9/1993 | ............ H04N 5/232 |
| JP | 05-281449 | | 10/1993 | |
| JP | 11-110045 | | 4/1999 | |

OTHER PUBLICATIONS

European Search Report issued on Jan. 18, 2012, that issued in the corresponding European Patent Application No. 11176906.3.

* cited by examiner

*Primary Examiner* — Clayton E Laballe
*Assistant Examiner* — Leon W Rhodes, Jr.
(74) *Attorney, Agent, or Firm* — Cowan, Liebowitz & Latman, P.C.

(57) ABSTRACT

A lens driving apparatus comprises: a zoom lens driven in an optical axis direction; first and second correction lenses driven in the optical axis direction; a storage unit that stores, for each predetermined focal length, positional relationships between the zoom lens, and the first and second correction lenses used for correcting a shift of an image plane upon driving of the zoom lens; a position detection unit that detects a position of the second correction lens; and a control unit that calculates driving amounts of the first correction lens and the second correction lens, and controls driving of the first and second correction lenses. The control means corrects an image plane position difference caused by a difference between a position of the second correction lens corresponding to a position of the zoom lens, and the detected position of the second correction lens, by moving the first correction lens.

5 Claims, 13 Drawing Sheets

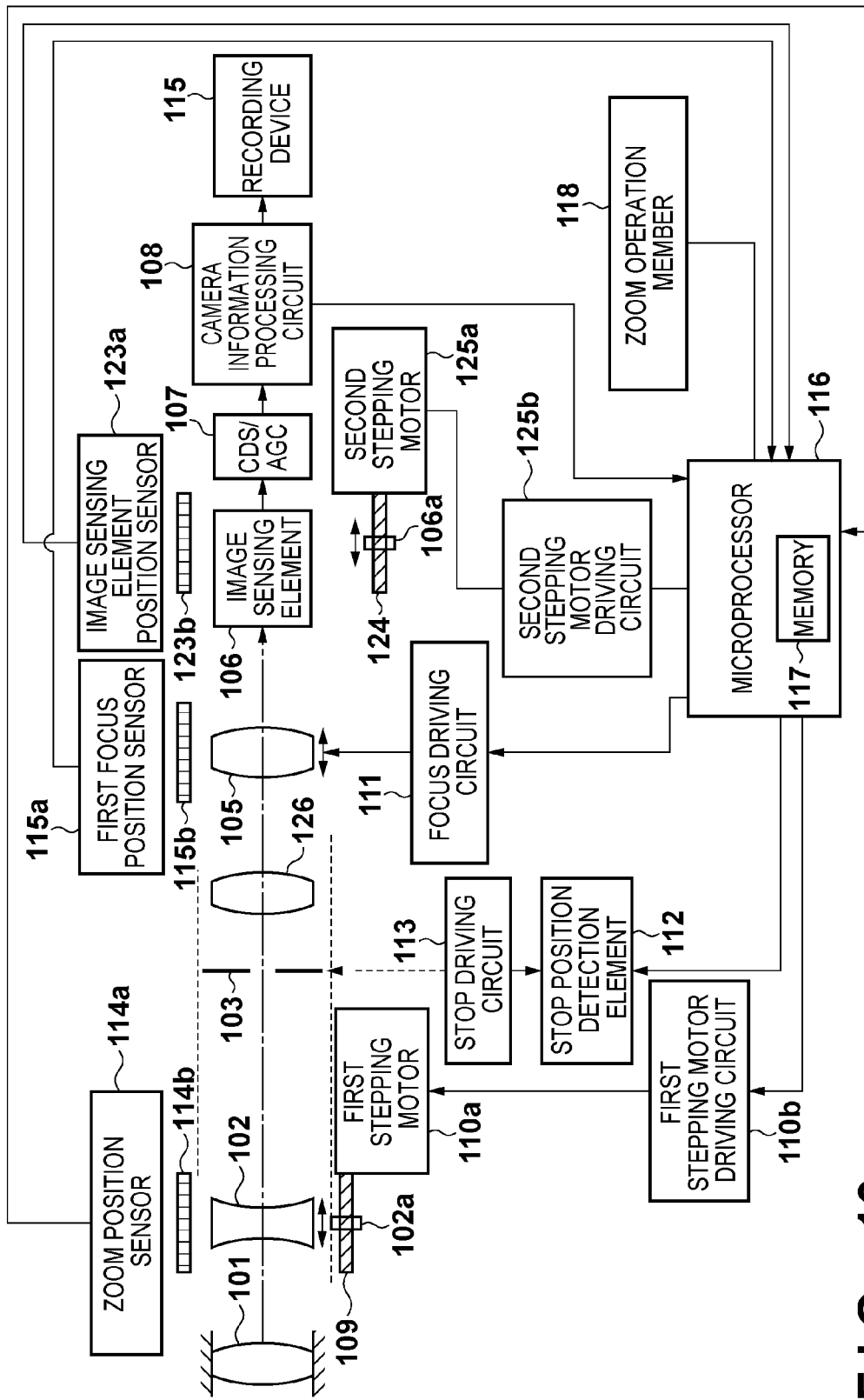
F I G. 10

LENS DRIVING APPARATUS AND CONTROL METHOD THEREOF, AND IMAGE CAPTURING APPARATUS AND CONTROL METHOD THEREOF

BACKGROUND OF THE INVENTION

1. Field of the Invention

The present invention relates to a lens driving apparatus and control method thereof, and an image capturing apparatus and control method thereof and, more particularly, to a lens driving apparatus which corrects a shift of an image plane upon driving of a zoom lens and a control method thereof, and an image capturing apparatus and control method thereof.

2. Description of the Related Art

Some optical apparatuses have a zoom optical system that allows zooming as an imaging optical system. Especially, video cameras normally use a zoom optical system called a rear-focus type. In the zoom optical system of the rear-focus type, an image plane shift (defocus) occurs at the time of zooming by moving a zoom lens. Hence, control is made to maintain an in-focus state by moving a focus correction lens arranged on the image plane side of the zoom lens, so as to correct an image plane shift. A moving position of the focus correction lens is decided in advance for each object distance based on digital cam data (to be simply referred to as cam data hereinafter) indicating a position of the focus correction lens corresponding to a position of the zoom lens.

In order to attain zooming while maintaining an in-focus state in such zoom optical system, the positions of the zoom lens and focus correction lens have to accurately keep a relationship, which is specified by the cam data. The position of the zoom lens can be obtained by counting the number of pulses of a driving pulse signal applied to a stepping motor used to move the zoom lens from a predetermined reference position. For this reason, by controlling the position of the focus correction lens according to the number of pulses of the driving pulse signal (to be referred to as the number of driving pulses hereinafter), the zoom lens and focus correction lens can be moved while keeping the relationship specified by the cam data.

Some optical apparatuses have, as lens driving apparatuses, a driving mechanism configured by a stepping motor as a driving source, a feed screw rotated by the stepping motor, and a rack which is attached to a lens holding member and engages with the feed screw. In order to attain a size reduction of the optical apparatus having such driving mechanism, it is effective to reduce a consumption power by lowering the rotational speed and output torque of the stepping motor, thereby reducing a size of a battery. However, when the output torque of the stepping motor is lowered, if a lens driving load becomes heavier, the stepping motor readily steps out. A driving amount of the stepping motor is normally controlled based on the number of pulses of a driving pulse signal applied to that stepping motor. Hence, when stepping-out occurs, the correspondence relationship between the driving amount of the stepping motor and the lens position is destroyed, and the lens position can no longer be accurately controlled.

Also, it is possible to reduce an engaging pressure of the rack to the feed screw so as to reduce the lens driving load. However, in this case, so-called jumping (the rack overleaps threads of the feed screw) readily occurs, and the lens position can no longer be accurately controlled.

Japanese Patent Laid-Open No. 05-281449 discloses a lens driving apparatus which includes a position sensor used to detect the position of a lens moved by a stepping motor. In this apparatus, when stepping-out of the stepping motor or jumping of a driving mechanism has occurred, the control of the stepping motor is corrected according to the lens position detected by the position sensor, thus allowing accurate lens position control.

Also, Japanese Patent Laid-Open No. 11-110045 discloses a lens driving apparatus which detects the position of a lens moved by a stepping motor by a position sensor, and executes feedback control of the stepping motor using the detection result, so as to improve the lens position control accuracy.

However, an engaging portion of the feed screw and rack, and a coupled portion of the lens holding member used to hold the zoom lens and the rack in the driving mechanism, which transmits the driving force of the stepping motor to the zoom lens, normally suffer backlashes. The feed screw and rack include manufacturing errors such as thread pitch errors. Furthermore, the stepping motor also has an individual difference of an actual driving amount with respect to the number of pulses of a driving pulse signal. Such backlashes, manufacturing errors, and individual difference cause a mismatch between the number of driving pulses applied to the stepping motor and the actual zoom lens position. As a result, the relationship between the positions of the zoom lens and focus correction lens deviates from that specified by the cam data, thus causing a defocus upon zooming.

Furthermore, in order to attain a compact, wide-angle zoom optical system of the rear-focus type, a lens type which drives another correction lens in an optical axis direction in addition to the zoom lens and focus correction lens is available. This lens type is designed, so that zooming is done by moving the zoom lens and the other correction lens which sandwich a stop fixed with respect to the image plane at predetermined ratios, and an image plane shift is corrected by moving the focus correction lens. In this case, an in-focus state cannot be maintained unless the three or more lenses are driven to keep a predetermined positional relationship. Therefore, it becomes further difficult to maintain an object image in an in-focus state upon driving the zoom lens.

However, in Japanese Patent Laid-Open Nos. 05-281449 and 11-110045, by arranging the position sensor for the zoom lens moved by the stepping motor, the position control accuracy of the zoom lens itself is merely improved.

SUMMARY OF THE INVENTION

The present invention has been made in consideration of the above situation, and correctly controls the positional relationship between a zoom lens and a plurality of correction lenses in a zoom optical system of a lens type having three or more driving systems, thereby preventing a performance drop such as a defocus.

According to the present invention, provided is a lens driving apparatus comprising: a zoom lens which is driven in an optical axis direction; a first correction lens capable of being driven in the optical axis direction; a second correction lens capable of being driven in the optical axis direction; a storage unit configured to store, for each predetermined focal length, positional relationships between the zoom lens, and the first correction lens and the second correction lens which are required to correct a shift of an image plane upon driving of the zoom lens; a position detection unit configured to detect a position of the second correction lens; and a control unit configured to calculate driving amounts of the first correction lens and the second correction lens, and control driving of the first correction lens and the second correction lens, wherein the control unit corrects an image plane position difference caused by a difference between a position of the second correction lens which corresponds to a position of the zoom lens and is stored in the storage unit, and a position of the second correction lens detected by the position detection unit, by moving the first correction lens.

Further, according to another aspect of the present invention, provided is a lens driving apparatus comprising: a zoom lens which is driven in an optical axis direction; a first correction lens capable of being driven in the optical axis direction; a second correction lens capable of being driven in the optical axis direction; a storage unit configured to store first information which represents, for each predetermined focal length, positional relationships between the zoom lens, and the first correction lens and the second correction lens which are required to correct a shift of an image plane upon driving of the zoom lens, and second information which represents a shift amount of the image plane per unit moving amount of each of the first correction lens and the second correction lens; a position detection unit configured to detect a position of the second correction lens; a first driving unit configured to drive the first correction lens; a second driving unit configured to drive the second correction lens; and a control unit configured to calculate driving amounts of the first correction lens and the second correction lens, and control driving of the first driving unit and the second driving unit, wherein the first driving unit has a higher resolution than the second driving unit, and the control unit calculates a correction amount of the first correction lens based on a difference between a position of the second correction lens corresponding to a position of the zoom lens in the first information and a position of the second correction lens detected by the position detection unit, and the second information.

Further, according to the present invention, provided is a control method of a lens driving apparatus which comprises a zoom lens which is driven in an optical axis direction, a first correction lens capable of being driven in the optical axis direction, a second correction lens capable of being driven in the optical axis direction, and a storage unit configured to store, for each predetermined focal length, positional relationships between the zoom lens, and the first correction lens and the second correction lens which are required to correct a shift of an image plane upon driving of the zoom lens, the method comprising: a position detection step of detecting a position of the second correction lens; and a control step of calculating driving amounts of the first correction lens and the second correction lens, and controlling driving of the first correction lens and the second correction lens, wherein in the control step, an image plane position difference caused by a difference between a position of the second correction lens which corresponds to a position of the zoom lens and is stored in the storage unit, and a position of the second correction lens detected in the position detection step, is corrected by moving the first correction lens.

Furthermore, according to another aspect of the present invention, provided is an image capturing apparatus comprising: a zoom lens which is driven in an optical axis direction; a correction lens capable of being driven in the optical axis direction; an image sensing unit configured to photoelectrically convert incident light, and output an electric signal, the image sensing unit capable of being driven in the optical axis direction; a storage unit configured to store, for each predetermined focal length, positional relationships between the zoom lens, and the correction lens and the image sensing unit which are required to correct a shift of an image plane upon driving of the zoom lens; a position detection unit configured to detect a position of the image sensing unit; and a control unit configured to calculate driving amounts of the correction lens and the image sensing unit, and control driving of the correction lens and the image sensing unit, wherein the control unit corrects an image plane position difference caused by a difference between a position of the image sensing unit which corresponds to a position of the zoom lens and is stored in the storage unit, and a position of the image sensing unit detected by the position detection unit, by moving the correction lens.

Further, according to the present invention, provided is a control method of an image capturing apparatus which comprises a zoom lens which is driven in an optical axis direction, a correction lens capable of being driven in the optical axis direction, an image sensing unit configured to photoelectrically convert incident light, and output an electric signal, the image sensing unit capable of being driven in the optical axis direction, and a storage unit configured to store, for each predetermined focal length, positional relationships between the zoom lens, and the correction lens and the image sensing unit which are required to correct a shift of an image plane upon driving of the zoom lens, the method comprising: a position detection step of detecting a position of the image sensing unit; and a control step of calculating driving amounts of the correction lens and the image sensing unit, and controlling driving of the correction lens and the image sensing unit, wherein in the control step, an image plane position difference caused by a difference between a position of the image sensing unit which corresponds to a position of the zoom lens and is stored in the storage unit, and a position of the image sensing unit detected in the position detection step, is corrected by moving the correction lens.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 is a block diagram showing an arrangement of a video camera according to a second embodiment;

DESCRIPTION OF THE EMBODIMENTS

Exemplary embodiments of the present invention will be described in detail in accordance with the accompanying drawings.

First Embodiment

Figure 1:
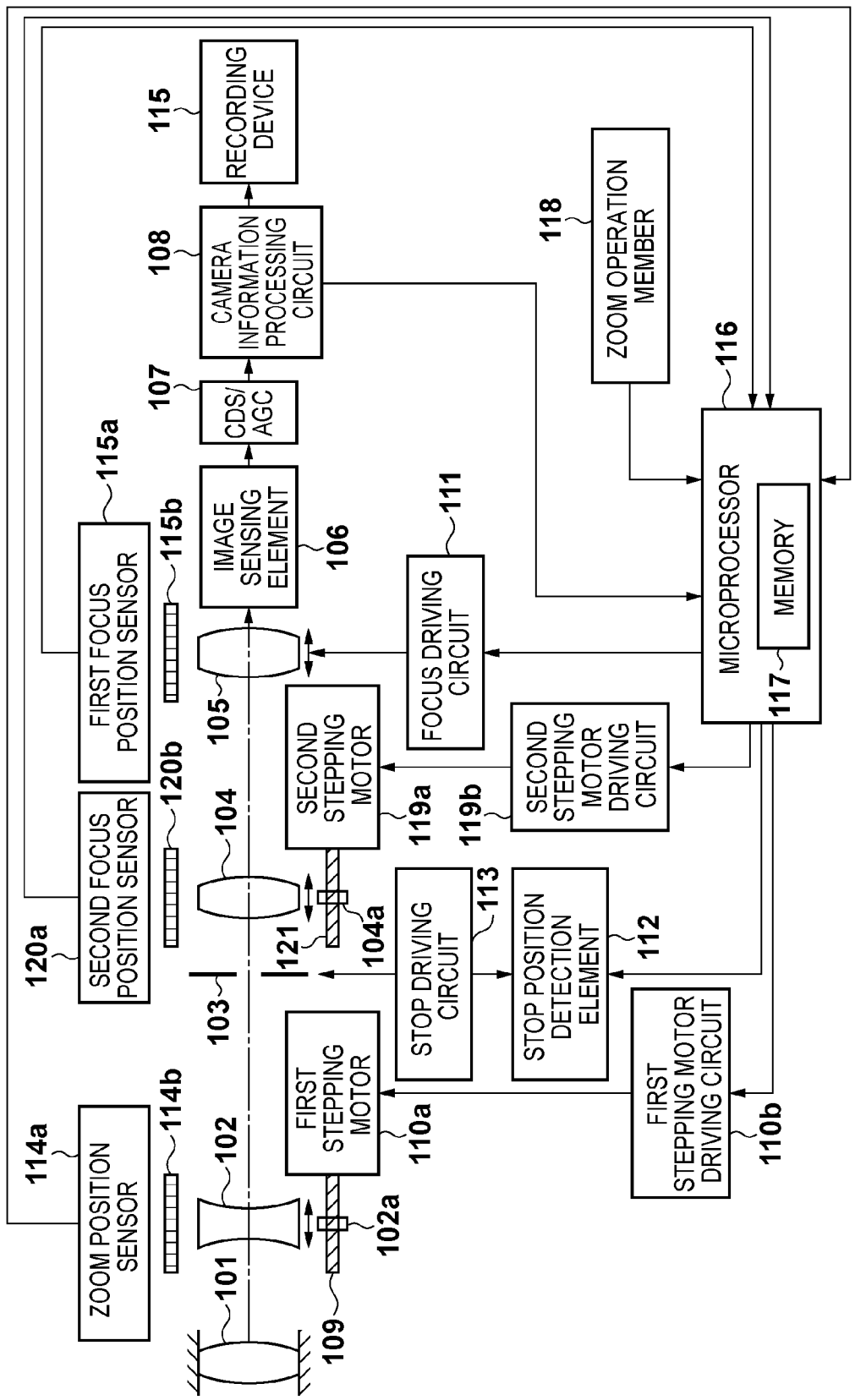
FIG. 1 is a block diagram showing an arrangement of a video camera according to a first embodiment.

FIG. 1 is a block diagram showing an arrangement of a video camera as an example of an image capturing apparatus having a lens driving apparatus according to a first embodiment of the present invention. Note that this embodiment will explain a video camera. However, the present invention is not limited to the video camera, and is applicable to other image capturing apparatuses such as a digital still camera, for example.

Referring to FIG. 1, reference numeral 101 denotes a first fixed lens; 102, a zoom lens which moves in an optical axis direction to attain zooming; and 103, a stop. Reference numerals 104 and 105 denote focus correction lenses which have both a function of correcting a shift of a focal plane upon zooming and a focusing function, and are drivable in the optical axis direction. The lens 104 will be referred to as a "second focus correction lens" and the lens 105 will be referred to as a "first focus correction lens" hereinafter. The first fixed lens 101, zoom lens 102, stop 103, second focus correction lens 104, and first focus correction lens 105 configure an imaging optical system.

In the first embodiment, a first stepping motor 110a and second stepping motor 119a are controlled by an open loop control method. More specifically, a microprocessor 116 drives the first stepping motor 110a via a first stepping motor driving circuit 110b so as to move the zoom lens 102 to a predetermined reference position upon power-ON of the video camera. This operation is called a zoom reset operation. The state that the zoom lens 102 is moved to the reference position can be detected by a reference position sensor (not shown). The reference position sensor is configured by, for example, a photointerrupter. In this case, a light shielding portion provided to the zoom lens 102 (a lens holding member which holds this lens in practice) enters between a light-emitting unit and light-receiving unit of the photointerrupter, and the photointerrupter is switched from a light-receiving state to a light-shielded state. Thus, the state that the zoom lens 102 is moved to the reference position is detected.

After the zoom reset operation, the microprocessor 116 drives the first stepping motor 110a to move the zoom lens 102 to an imaging start position (a wide-angle end in this case; this position may be a telephoto end). The number of driving pulses to be applied to the first stepping motor 110a to move the zoom lens 102 from the reference position to the wide-angle end is stored in advance in a memory 117 included in the microprocessor 116.

Likewise, a reset operation of the second focus correction lens 104 is also performed. As in the zoom lens 102, the stepping motor 119a is driven via a second stepping motor driving circuit 119b so as to move the second focus correction lens 104 to a predetermined reference position. After the reset operation, the microprocessor 116 drives the second stepping motor 119a to move the second focus correction lens 104 to an imaging start position. As the imaging start position, a position according to that of the zoom lens 102 is calculated from information stored in the memory 117 included in the microprocessor 116. Then, an image capturing operation by the video camera is ready to start.

When the user operates a zoom operation member 118 to move the zoom lens 102 from the wide-angle end to an arbitrary position, the microprocessor 116 calculates the number of pulses of a driving pulse signal (to be referred to as the "number of driving pulses" hereinafter) to be applied to the first stepping motor 110a. This calculation result will be referred to as the number of target driving pulses (target driving amount) hereinafter. Then, the microprocessor 116 applies the driving pulse signal to the first stepping motor 110a via the first stepping motor driving circuit 110b until the actual number of driving pulses (actual driving amount) matches the number of target driving pulses.

At the same time, the microprocessor 116 calculates the number of target driving pulses to be applied to the second stepping motor 119a from information stored in the memory 117, so as to drive the second focus correction lens 104 according to the number of target driving pulses of the zoom lens 102. Then, the microprocessor 116 applies the driving pulse signal to the second stepping motor 119a via the second stepping motor driving circuit 119b until the actual driving amount matches the number of target driving pulses.

In this way, the first embodiment adopts the open loop control method for the zoom lens 102 and the second focus correction lens 104. Then, the driving control of the zoom lens 102 and second focus correction lens 104 can be attained by a simpler arrangement than a case using a feedback control method.

A mechanical structure of the stepping motor 110a will be described below with reference to FIGS. 2A and 2B.

Figure 2A:
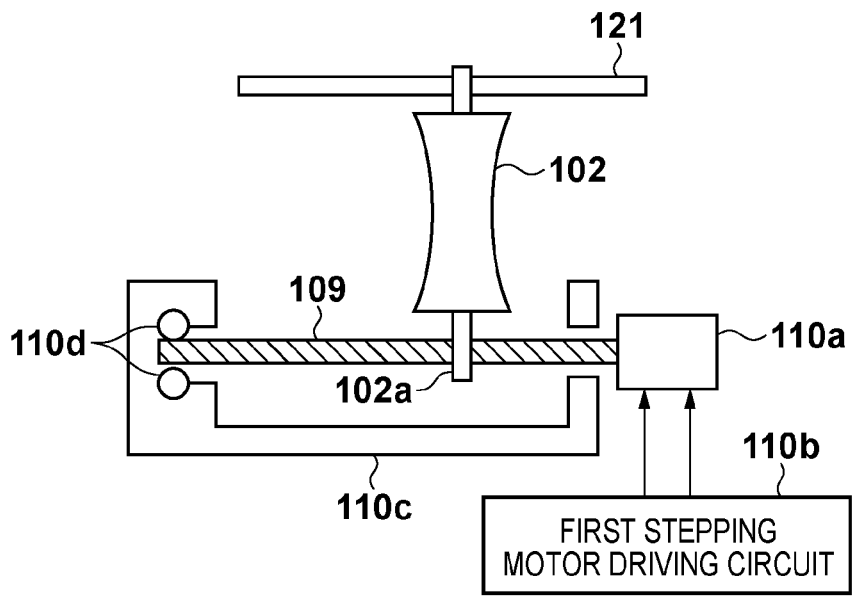
FIGS. 2A and 2B are views showing a structure of a stepping motor.

FIG. 2A is a view showing an example of a structure of the first stepping motor 110a required to drive the zoom lens 102 in the arrangement of the video camera shown in FIG. 1. A feed screw is directly threaded on a rotation shaft 109 of the first stepping motor 110a. The rotation shaft 109 is received by a bearing 110d, and the bearing 110d and stepping motor 110a are integrated by a member 110c. Reference numeral 121 denotes a guide rod. When the rotation shaft 109 is rotated by the first stepping motor 110a, the guide rod 121 prevents the zoom lens 102 from being rotated in a plane perpendicular to the optical axis. Then, a rack 102a attached to the zoom lens 102 is moved parallel to the optical axis, and the lens 102 is also moved parallel to the optical axis accordingly.

Figure 2B:
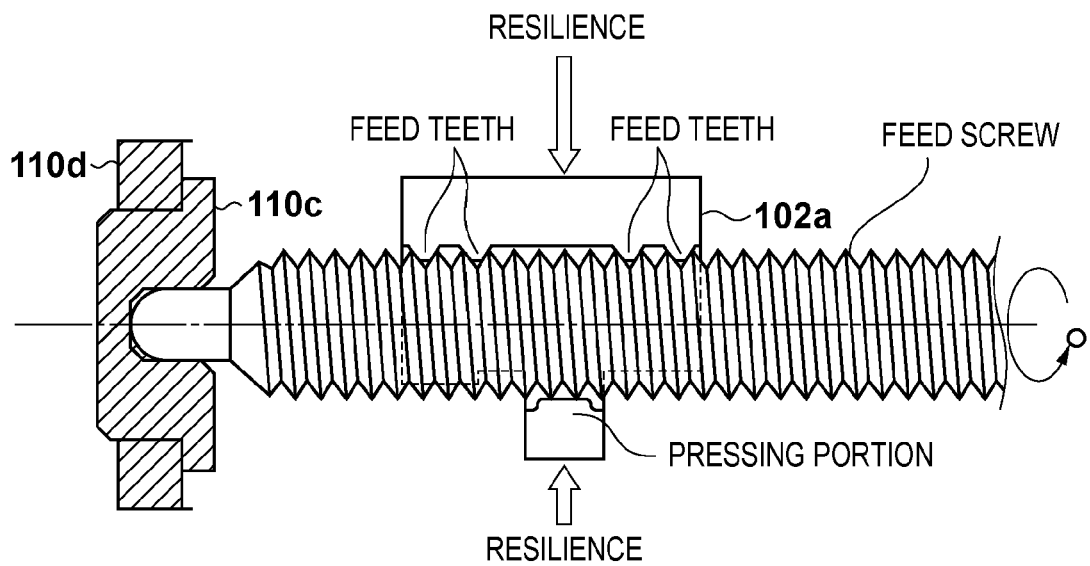

As shown in FIG. 2B, the rack 102a has a structure which is pressed downward by a resilience of a spring member (not shown) so as to cause feed teeth to engage with the feed screw. Then, upon rotation of the rotation shaft 109, the feed teeth are pushed out by the feed screw, thus moving the rack 102a in the optical axis direction. FIG. 2B illustrates that no gaps are formed between the feed teeth and feed screw. However, in practice, gaps are formed between the feed screw and feed teeth due to, for example, variations upon manufacturing and aging, thus often producing backlashes.

Position information of the zoom lens 102 can be obtained as a position change from the reference position using a count value of the number of driving pulses of the first stepping motor 110a. However, when the backlashes are produced, as described above, the position of the zoom lens 102, which is obtained from the count value of the number of driving pulses, does not match the actual position of the zoom lens 102.

Hence, in the first embodiment, in order to detect the actual position (real position) of the zoom lens 102, a zoom position sensor 114a is arranged. A position scale 114b is attached to the zoom lens 102 (the lens holding member which holds this lens in practice), and the zoom position sensor 114a is fixed at a position opposing this position scale 114b.

The position scale 114b is formed with a scale pattern such as a magnetic pattern or light reflecting pattern which changes in the optical axis direction. When the zoom position sensor 114a reads a magnetic signal or optical signal which changes according to the scale pattern on the position scale 114b, the real position of the zoom lens 102 in the optical axis direction can be detected. A detection signal of the zoom position sensor 114a is input to the microprocessor 116, and is used in the driving control of the first focus correction lens 105 and second focus correction lens 104 in a zooming operation.

As in the zoom lens 102, position information of the second focus correction lens 104 from the reference position can be obtained using the count value of the number of driving pulses of the second stepping motor 119a. However, backlashes are often produced between a feed screw 121 and rack 104a which configure a driving mechanism of the second focus correction lens 104. Also, the feed screw 121 and rack 104a may suffer manufacturing errors, and the driving amount corresponding to the number of driving pulses of the stepping motor 119a may have an individual difference. In these cases, the position of the second focus correction lens 104, which is obtained from the count value of the number of driving pulses, does not match the actual position of the second focus correction lens 104.

Hence, in the first embodiment, a second focus position sensor 120a is arranged to detect the real position of the second focus correction lens 104 as in the zoom lens 102. A position scale 120b is attached to the second focus correction lens 104 (a lens holding member which holds this lens in practice), and the second focus position sensor 120a is fixed at a position opposing this position scale 120b.

The position scale 120b is formed with a scale pattern such as a magnetic pattern or light reflecting pattern which changes in the optical axis direction. When the second focus position sensor 120a reads a magnetic signal or optical signal which changes according to the scale pattern on the position scale 120b, the real position of the second focus correction lens 104 in the optical axis direction can be detected. A detection signal of the second focus position sensor 120a is input to the microprocessor 116, and is used in the correction driving control of the first focus correction lens 105 in a zooming operation.

Reference numeral 111 denotes a focus driving circuit which includes a focus motor (focus actuator) as a driving source of the first focus correction lens 105, and drives the focus motor according to a control signal from the microprocessor 116.

Reference numeral 115a denotes a first focus position sensor used to detect the real position of the first focus correction lens 105. A position scale 115b is attached to the first focus correction lens 105 (a lens holding member which holds this lens in practice), and the first focus position sensor 115a is fixed at a position opposing this position scale 115b.

The position scale 115b is formed with a scale pattern such as a magnetic pattern or light reflecting pattern which changes in the optical axis direction. When the first focus position sensor 115a reads a magnetic signal or optical signal which changes according to the scale pattern on the position scale 115b, the real position of the first focus correction lens 105 in the optical axis direction can be detected. A detection signal of the first focus position sensor 115a is input to the microprocessor 116, and is used in the feedback control of the position of the first focus correction lens 105 at the time of correction of an image plane shift upon zooming, and at the time of focusing.

The microprocessor 116 controls driving of the first stepping motor 110a, second stepping motor 119a, and focus motor by moving amounts corresponding to an operation of the zoom operation member 118, as described above. Also, the microprocessor 116 controls the operation of the overall video camera according to inputs from various switches. Furthermore, the microprocessor 116 has counters for counting the numbers of driving pulses of the first stepping motor 110a and second stepping motor 119a.

The memory 117 holds three kinds of data required to correct an image plane shift upon zooming.

First, digital cam data (to be referred to as "first cam data" hereinafter) which indicates the position of the first focus correction lens 105 according to the position of the zoom lens 102 is stored for each predetermined object distance. This first cam data is also called zoom tracking data, and indicates positions (locus) where the first focus correction lens 105 is to be moved, so as to maintain an in-focus state, when the zoom lens 102 is moved by the zooming operation.

Next, digital cam data (to be referred to as "second cam data" hereinafter) indicating the position of the second focus correction lens 104, which is to be uniquely decided according to the position of the zoom lens 102, is stored. This second cam data indicates positions (locus) where the second focus correction lens 104 is to be moved, so as to maintain an in-focus state, when the zoom lens 102 is moved by the zooming operation.

Lastly, first optical characteristic data including a first sensitivity and second sensitivity, which respectively represent moving amounts of an image plane per unit moving amount of the first focus correction lens 105 and second focus correction lens 104 according to the position of the zoom lens 102, is stored. This first optical characteristic data assumes a value obtained by dividing the second sensitivity according to the position of the zoom lens 102 by the first sensitivity. Then, when the target driving amount and real position of the second focus correction lens 104 are deviated, the first optical characteristic data is used to calculate an amount to be corrected of the first focus correction lens 105 so as to maintain an in-focus state. Note that this calculation method will be described in detail later with reference to FIG. 4.

The microprocessor 116 controls driving of the focus motor used to move the first focus correction lens 105 using the detection result of the real position after movement of the zoom lens 102 by the zoom position sensor 114a, the target driving amount of the first stepping motor 110a, the detection result of the real position after movement of the second focus correction lens 104 by the second focus position sensor 120a, the target driving amount of the second stepping motor 119a, the first and second cam data, and the first optical characteristic data.

The stop 103 adjusts a light amount by changing an aperture size when a plurality of aperture blades are opened/closed by a galvano type stop actuator (not shown). Reference numeral 113 denotes a stop driving circuit which drives the stop actuator according to a control signal from the microprocessor 116. Reference numeral 112 denotes a stop position detection element such as a Hall element which detects the open/close state (aperture value) of the aperture blades. A detection signal of the stop position detection element 112 is input to the microprocessor 116, and is used in control of an aperture value.

Reference numeral 106 denotes an image sensing element which is configured by, for example, a CCD sensor or CMOS sensor, and serves as a photoelectric conversion element for converting incident light into an electric signal. Reference numeral 107 denotes a CDS/AGC circuit which samples the output from the image sensing element 106, and adjusts a gain. Reference numeral 108 denotes a camera signal processing circuit, which applies various kinds of signal processing to the output signal from the CDS/AGC circuit 107 to generate a video signal. The generated video signal is sent to a recording device 115. The recording device 115 converts the video signal into a predetermined recording format, and records the converted video signal on a recording medium such as a magnetic tape, semiconductor memory, or optical disk.

The video signal is also input to the microprocessor 116. The microprocessor 116 extracts a luminance component from the input video signal, and controls the stop 103 via the stop driving circuit 113, so that the luminance component has an appropriate value (a value within a predetermined range). In this case, the microprocessor 116 receives a detection signal from the stop position detection element 112, and executes feedback control of the aperture value of the stop 103 based on this detection signal.

Zooming control in the video camera with the aforementioned arrangement will be described below with reference to the flowchart shown in FIG. 3. This zooming control is executed according to a computer program stored in the microprocessor 116. In this case, assume that the zoom lens 102 is located at an arbitrary position between the wide-angle end as the imaging start position and the telephoto end after the zoom reset operation.

In step S201, the microprocessor 116 reads out a count value (to be referred to as a "driving pulse count value" hereinafter) Pstp of the current number of driving pulses of the first stepping motor 110a from the internal counter. Then, the microprocessor 116 stores the driving pulse count value Pstp in its internal RAM (not shown). The driving pulse count value Pstp corresponds to the current position of the zoom lens 102, which is converted from the number of driving pulses.

In step S202, the microprocessor 116 reads an operation amount of the zoom operation member 118. Next, in step S203, the microprocessor 116 decides a zoom speed as a driving speed of the first stepping motor 110a according to the operation amount (to be referred to as a "zoom operation amount" hereinafter) of the zoom operation member 118 read in step S202.

Next, the microprocessor 116 determines in step S204 whether or not the zoom speed decided in step S203 is 0. If the zoom speed is not 0, the microprocessor 116 determines a state in which zooming is continued, and the process advances to step S205. If the zoom speed is 0, the microprocessor 116 determines a state in which zooming is not performed, and the process advances to step S207.

In step S205, the microprocessor 116 calculates the number ΔPstp of target driving pulses as the target driving amount of the first stepping motor 110a. In the video camera of the first embodiment, this zooming control computer program is executed at each cycle (for example, 1/60 sec in NTSC; 1/50 sec in PAL) of a vertical sync signal of the video signal. For this reason, assume that the number ΔPstp of target driving pulses corresponds to an amount by which the stepping motor 110a is driven at the zoom speed decided in step S204 during one cycle of the vertical sync signal. After that, the process advances to step S206.

In step S206, the microprocessor 116 adds or subtracts the driving pulse count value Pstp stored in the RAM in step S201 to or from the number ΔPstp of target driving pulses calculated in step S205 according to the zooming direction (telephoto or wide-angle direction). Thus, the microprocessor 116 calculates a target driving position Ptrgt of the stepping motor 110a, that is, of the zoom lens 102, and stores it in the RAM. After that, the process advances to step S208.

On the other hand, in step S207, the microprocessor 116 sets the current driving pulse count value Pstp of the stepping motor 110a as the target driving position Ptrgt, since zooming is not performed. After that, the process advances to step S208.

In step S208, the microprocessor 116 calculates a target position of the second focus correction lens 104 according to the target driving position Ptrgt of the zoom lens 102. In this case, the microprocessor 116 can uniquely decide the target position of the second focus correction lens 104 according to the position of the zoom lens 102 using the second cam data stored in the memory 117. The microprocessor 116 calculates the number of target driving pulses to be applied to the second stepping motor 119a so as to drive the second focus correction lens 104 based on the calculated target position. Note that the target position decision processing executed in step S208 will be described later with reference to FIG. 6.

In step S209, the microprocessor 116 executes processing for deciding the target position of the first focus correction lens 105. This processing will also be described later with reference to FIG. 4.

In step S210, the microprocessor 116 drives the first stepping motor 110a toward the target driving position Ptrgt calculated in step S206. Furthermore, the microprocessor 116 drives the second stepping motor 119a so as to move the second focus correction lens 104 to the target position decided in step S208. Moreover, the microprocessor 116 drives the focus motor so as to move the first focus correction lens 105 to the target position decided in step S209. Note that when Pstp=Ptrgt in step S207, the zoom lens 102, first focus correction lens 105, and second focus correction lens 104 are not driven. Upon completion of driving of the respective lenses, the processing ends.

The decision processing of the target position of the second focus correction lens 104 executed in step S208 in FIG. 3 will be described below with reference to the flowchart of FIG. 6.

In step S501, the microprocessor 116 reads out a current driving pulse count value Pf2stp of the second stepping motor 119a from the internal counter. Next, in step S502, the microprocessor 116 reads out position detection data Psens of the zoom lens 102 from the zoom position sensor 114a, and stores it in the RAM.

In step S503, the microprocessor 116 decides the target position to which the second focus correction lens 104 is to track using the moving target position of the zoom lens 102 and the second cam data. In this case, the drive pulse count value Pstp of the zoom lens 102 detected in step S201 is a relative zoom position obtained by adding the pulse count to the reference position, but it suffers errors caused by, for example, backlashes of the driving mechanism and thread pitch variations. For this reason, the position indicated by the driving pulse count value Pstp obtained by adding or subtracting the pulse count to or from the reference position of the zoom lens 102 does not always match the position indicated by the position detection data Psens detected by the zoom position sensor 114a. Therefore, when an in-focus position to which a focus is to be tracked in practice is controlled based only on the driving pulse count value Pstp, a deviation is produced, and an object image is consequently kept defocused, resulting in a performance drop as the image capturing apparatus.

Hence, in step S503, the microprocessor 116 adds the number ΔPstp of target driving pulses decided in step S205 to the position detection data Psens indicating the current position of the zoom lens 102 according to:

$$Pstgt = Psens + \Delta Pstp \quad (1)$$

Then, the microprocessor 116 decides the obtained zoom position as a target position Pstgt of the zoom lens 102 used to track a focus, and stores it in the RAM.

In step S504, the microprocessor 116 reads out the second cam data to be currently tracked. Using this second cam data, the position of the second focus correction lens 104, which is required to maintain a current in-focus state, and corresponds to the position of the zoom lens 102, can be calculated.

In step S505, the microprocessor 116 decides the target position of the second focus correction lens 104. In this case, the microprocessor 116 decides the target position of the second focus correction lens 104 corresponding to the target position Pstgt of the zoom lens 102 using the second cam data stored in the memory. After the target position is decided, the process advances to step S209.

The decision processing of the target position of the first focus correction lens 105 executed in step S209 in FIG. 3 will be described below with reference to the flowchart of FIG. 4.

In step S301, the microprocessor 116 reads out position detection data Pfsens of the first focus correction lens 105 from the first focus position sensor 115a, and stores it in the RAM. In the first embodiment, since the first focus correction lens 105 assumes a servo motor such as a VCM, the position sensor is arranged. When a stepping motor is used as an actuator for the first focus correction lens 105, a pulse count value is used as focus position data.

In step S302, the microprocessor 116 reads out position detection data Pf2sens of the second focus correction lens 104 from the second focus position sensor 120a, and stores it in the RAM. The microprocessor 116 reads out the current driving pulse count value Pf2stp of the second stepping motor 119a from the internal counter. In the first embodiment, the stepping motor is used to drive the second focus correction lens 104, and the position to be detected in this case means not a pulse count value but an actual lens position.

In step S303, the microprocessor 116 reads out the position detection data Psens of the zoom lens 102 from the zoom position sensor 114a, and stores it in the RAM.

In step S304, the microprocessor 116 reads out the first cam data to be currently tracked. Using this first cam data, the position of the first focus correction lens 105, which is required to maintain a current in-focus state and corresponds to the position of the zoom lens 102, can be calculated.

In the subsequent processes, the microprocessor 116 decides the target position to which the first focus correction lens 105 is to track using the moving target position of the zoom lens 102 and the first cam data. In this case, the driving pulse count value Pstp of the zoom lens 102 detected in step S201 is a relative zoom position obtained by adding a pulse count to the reference position, and suffers errors caused by, for example, backlashes of the driving mechanism and thread pitch variations in practice. For this reason, the position indicated by the driving pulse count value Pstp obtained by adding or subtracting a pulse count to or from the reference position of the zoom lens 102 does not always match the position indicated by the position detection data Psens detected by the zoom position sensor 114a. Therefore, when an in-focus position to which a focus is to be tracked in practice is controlled based only on the driving pulse count value Pstp, a deviation is produced, and an object image is consequently kept defocused, resulting in a performance drop as the image capturing apparatus.

Hence, in step S305, the microprocessor 116 adds the number ΔPstp of target driving pulses decided in step S205 to the position detection data Psens indicating the current position of the zoom lens 102 according to equation (1) above as in step S503. Then, the microprocessor 116 decides the obtained zoom position as the target position Pstgt of the zoom lens 102 used to track a focus, and stores it in the RAM.

The microprocessor 116 then checks in step S306 whether or not the first stepping motor 110a used to drive the zoom lens 102 is in a driving stopped state. If the first stepping motor 110a is being driven, the process advances to step S307. In step S307, the microprocessor 116 calculates a deviation ΔPf2gap when the second focus correction lens 104 is stopped. The deviation ΔPf2gap can be calculated from a difference between the driving pulse count value Pf2stp and the position detection data Pf2sens according to:

$$\Delta Pf2gap = Pf2stp - Pf2sens \quad (2)$$

In step S308, the microprocessor 116 calculates a correction amount of the first focus correction lens 105, which is required to correct the deviation ΔPf2gap of the second focus correction lens 104 calculated in step S307 according to equation (5) to be described later. Note that this correction method is a characteristic feature of the present invention, and zoom driving is executed while correcting the deviation of the second focus correction lens 104 by the first focus correction lens 105 during zooming, thus contributing to improvement of a focusing performance during zooming. This method will be described in detail below.

The correction method is characterized by using sensitivities. The sensitivity is a change in image plane when a lens is moved by a predetermined amount. A shift amount ΔDf2 of the image plane due to the deviation of the second focus correction lens 104 is calculated by:

$$Df2 = \Delta Pf2gap \times \text{sensitivity of second focus correction lens} \quad (3)$$

Subsequently, the microprocessor 116 calculates a correction amount ΔPfcmp required to be corrected by the first focus correction lens 105 using the image plane shift amount ΔDf2 of the second focus correction lens 104. In this case, the deviation ΔPf2gap of the second focus correction lens 104 is converted into a correction amount of the first focus correction lens 105 according to:

$$\Delta Pfcmp = \Delta Df2 \div \text{sensitivity of first focus correction lens} \quad (4)$$

By combining above equations, we have:

$$\Delta Pfcmp = \Delta Pf2gap \times (\text{sensitivity of second focus correction lens} \div \text{sensitivity of first focus correction lens}) = \Delta Pf2gap \times K \quad (5)$$

That is, by multiplying the deviation ΔPf2gap of the second focus correction lens by a correction coefficient K, which is different depending on the zoom position, the deviation of the second focus correction lens can be converted into the correction amount ΔPfcmp of the first focus correction lens.

In step S309, the microprocessor 116 calculates a corresponding position of the first focus correction lens 105 corresponding to the target position Pstgt of the zoom lens 102 with reference to the first cam data stored in the memory 117. Letting Pfsens' be the corresponding position of the first focus correction lens 105, a target position Pftgt' of the first focus correction lens 105 is decided as:

$$Pftgt' = Pfsens' + \Delta Pfcmp \quad (6)$$

After the target position of the first focus correction lens 105 is decided, the process advances to step S210.

On the other hand, if it is determined in step S306 that the first stepping motor 110a used to drive the zoom lens 102 is in a driving stopped state, the process advances to step S310. In this case, although the zoom lens 102 is stopped, the position detection data Psens of the zoom lens 102 does not always match the zoom target position Ptrgt, as described above, and the zoom lens 102 is stopped at a position having an error equal to or smaller than a threshold. On the other hand, in the processes executed so far, the focus target position is calculated as a position on the cam data corresponding to the zoom target position Ptrgt. For this reason, when the actual position of the zoom lens 102 does not match the zoom target position Ptrgt, it deviates from the cam data required to maintain an in-focus state. Especially, when the image capturing apparatus is in a manual focus mode, it does not perform any autofocus operation, and an object image is kept defocused by a deviation amount from the cam data, resulting in a performance drop as the image capturing apparatus. In order to prevent this, in step S310, the microprocessor 116 calculates a first focus target position corresponding to the position detection data Psens of the zoom lens 102 from the zoom position sensor 114a using the first cam data, and sets it as a target position of the first focus correction lens 105. Then, the process advances to step S311.

In step S311, for the same reason as above, the microprocessor 116 calculates a second focus position corresponding to the position detection data Psens of the zoom lens 102 from the zoom position sensor 114a using the second cam data, and sets it as a second focus target position. Then, the process advances to step S312.

In step S312, the microprocessor 116 calculates the deviation $\Delta Pf2gap$ when the second focus correction lens 104 is stopped. Assuming the second focus target position calculated in step S311 as Pf2stp, the deviation $\Delta Pf2gap$ is calculated from a difference between the second focus target position Pf2stp and the position detection data Pf2sens of the second focus correction lens 104 according to equation (2).

In step S313, the microprocessor 116 calculates the correction amount $\Delta Pfcmp$ of the first focus correction lens 105, which is required to correct the deviation $\Delta Pf2gap$ of the second focus correction lens 104 calculated in step S312 according to equation (5) above. Note that this correction method is a second characteristic feature of the present invention. In a zoom stopped state, the deviations of the zoom lens 102 and second focus correction lens 104 are corrected by the first focus correction lens 105 after zooming is stopped, thus contributing to improvement of a focusing performance in a zoom stopped state.

In step S314, the microprocessor 116 decides the target position Pftgt of the first focus correction lens 105 using the correction amount $\Delta Pfcmp$ of the first focus correction lens 105 and the first focus target position calculated in step S310, which is assumed as Pfsens, according to:

$$Pftgt = Pfsens + \Delta Pfcmp \quad (7)$$

Figure 7:
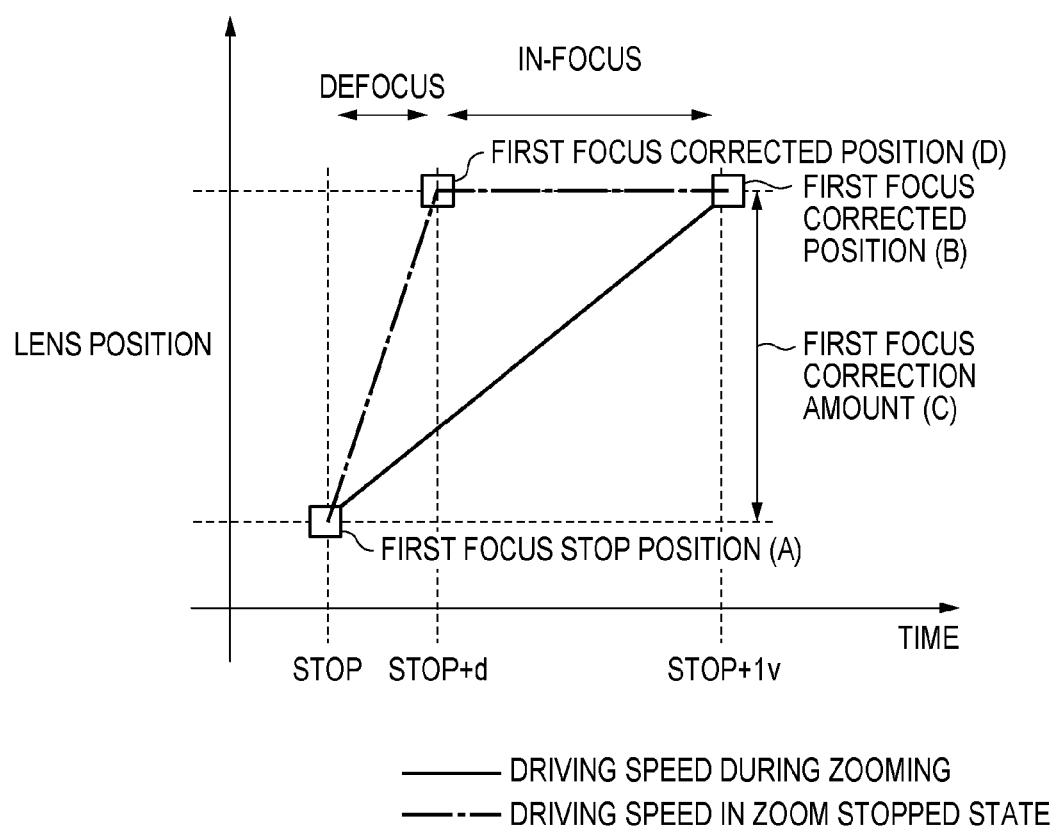
FIG. 7 is a graph for explaining speed settings of the first focus correction lens.

In step S315, the microprocessor 116 decides a target speed of the first focus correction lens 105. In the video camera of the first embodiment, this zooming control computer program is executed at each cycle (for example, 1/60 sec in NTSC; 1/50 sec in PAL) of a vertical sync signal of the video signal. For this reason, a speed that allows the lens to reach the target position within one cycle is set during zooming. However, when correction is made in a zoom stopped state, the first focus correction lens 105 is driven at a speed higher than a normal speed, as shown in FIG. 7. Thus, a defocus generation time period due to a stop deviation can be shortened.

When the first focus correction lens 105 is stopped at a first focus stop position (A) in FIG. 7, it is driven by a first focus correction amount (C) to reach a first focus corrected position (B) within 1V as one cycle, as indicated by the solid line. However, the user unwantedly observes a defocused state since an in-focus position is not set before the position (B) is reached. Hence, as indicated by the broken line, the first focus correction lens 105 is driven by a first focus correction amount (C) within a time period d shorter than one cycle to reach the first focus corrected position (D), thus greatly shortening a defocus generation period. Hence, the target speed assumes a value (a slope of the broken line) obtained by dividing the first focus correction amount (C) by the time period d. However, as the speed (the slope of the broken line) becomes higher, an overshoot with respect to the focus target position readily occurs. Hence, assume that the time period d is sufficiently measured, and a speed at which even occurrence of an overshoot is not recognized as a defocused state is set. After the target speed is set, the process advances to step S210.

Figure 5:
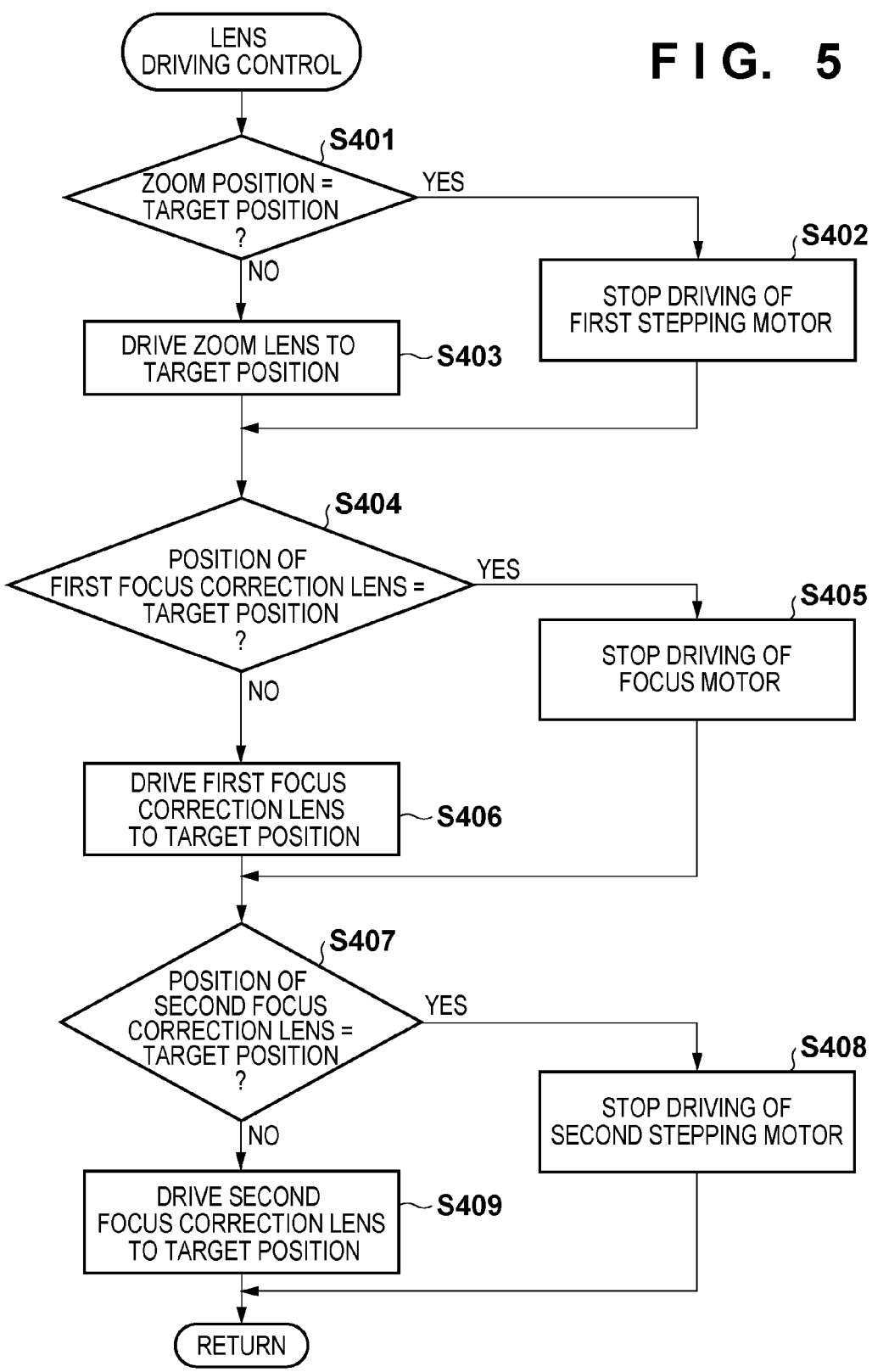
FIG. 5 is a flowchart showing position control of a zoom lens and focus correction lenses executed in the processing shown in FIG. 3.

The driving control of the zoom lens 102, first focus correction lens 105, and second focus correction lens 104, which is executed in step S210 in FIG. 3, will be described below with reference to the flowchart of FIG. 5.

The microprocessor 116 determines in step S401 whether or not the position of the zoom lens 102 matches the focus tracking zoom target position Pstgt. If they do not match, the process advances to step S403, and the microprocessor 116 drives the first stepping motor 110a to move the zoom lens 102 to the focus tracking zoom target position Pstgt. Then, the process advances to step S404. If the position of the zoom lens 102 matches the focus tracking zoom target position Pstgt, the process advances to step S402 to stop driving of the first stepping motor 110a. Then, the process advances to step S404.

Figure 4:
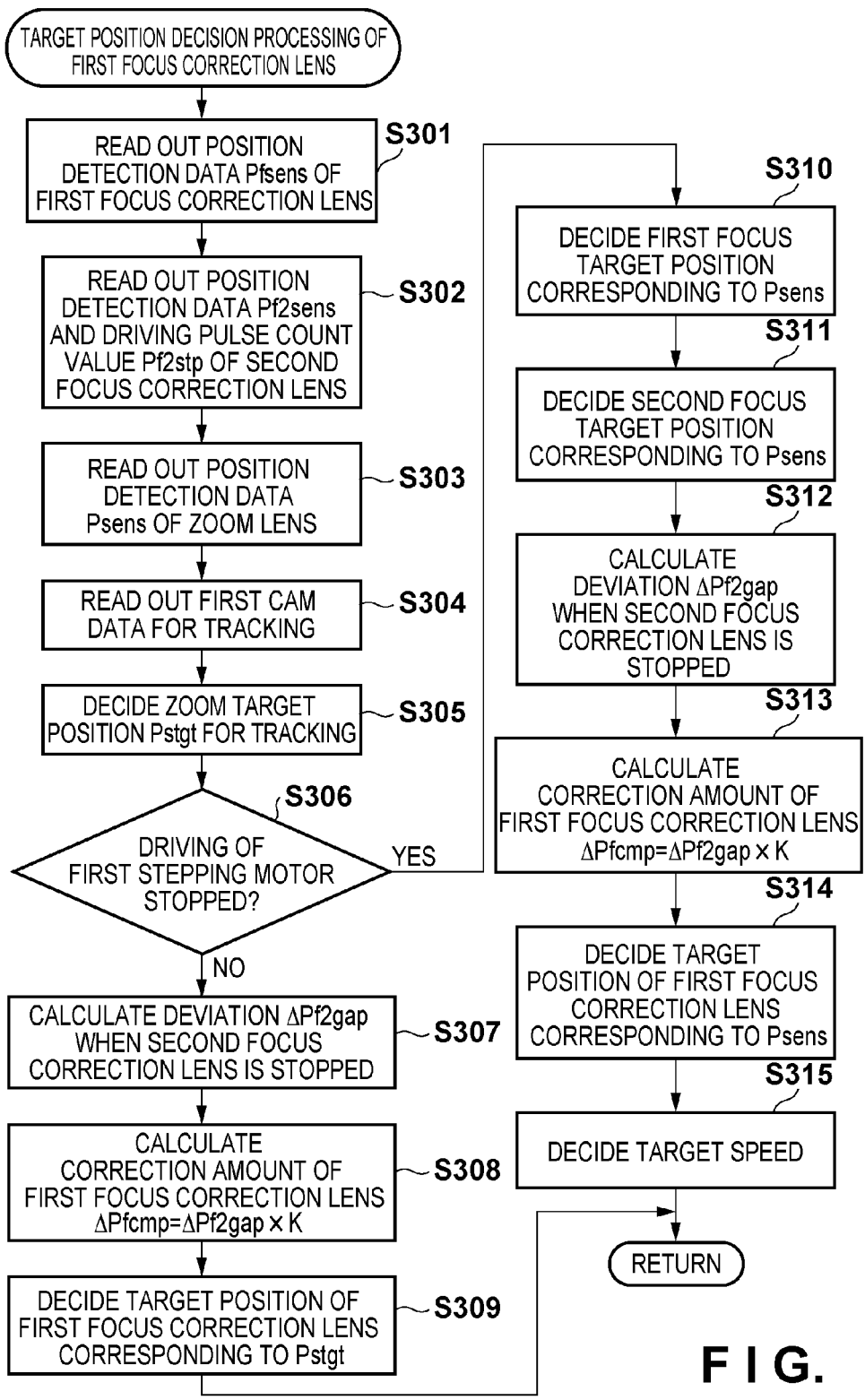
FIG. 4 is a flowchart showing details of target position decision processing of a first focus correction lens executed in the processing shown in FIG. 3.

The microprocessor 116 determines in step S404 whether or not the position of the first focus correction lens 105 (the detection position by the first focus position sensor 115a) matches the target position decided by the processing shown in FIG. 4. If they do not match, the process advances to step S406, and the microprocessor 116 drives the focus motor to move the first focus correction lens 105 to the target position. Then, the process advances to step S407. On the other hand, if it is determined that the position of the first focus correction lens 105 matches the target position, the process advances to step S405 to stop driving of the focus motor. Then, the process advances to step S407.

Figure 6:
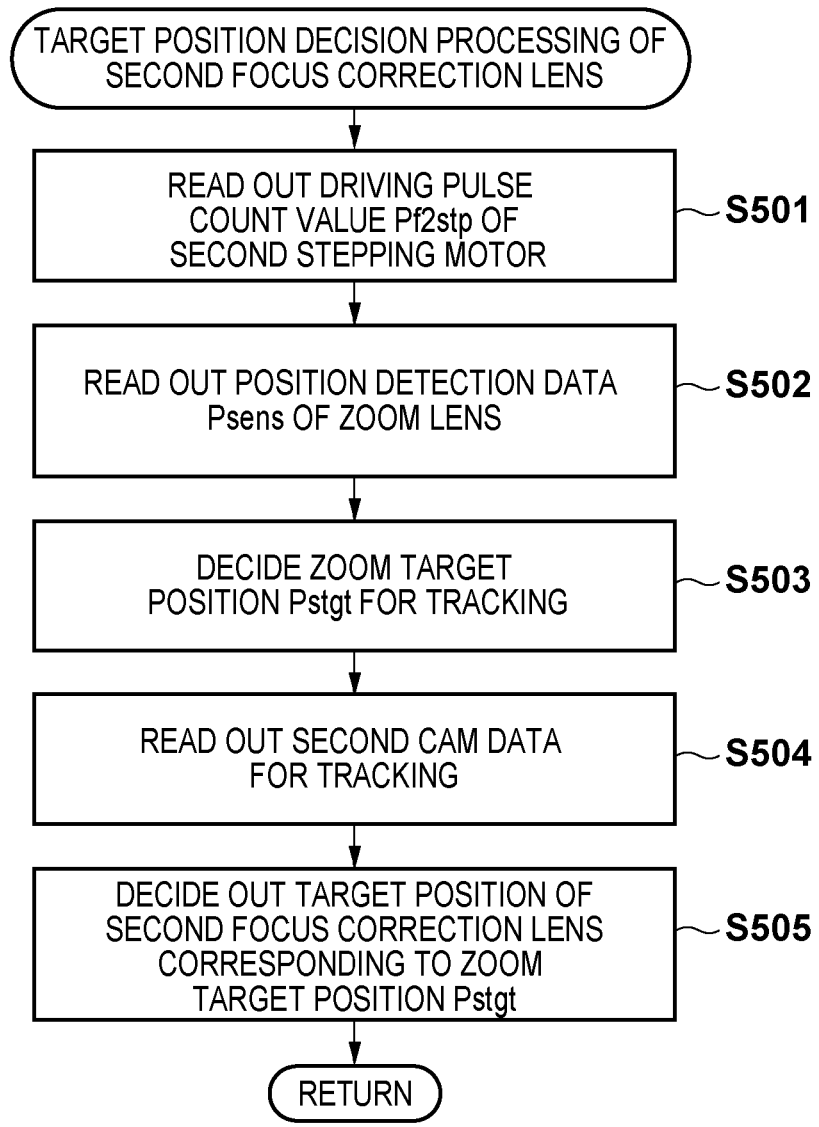
FIG. 6 is a flowchart showing details of target position decision processing of a second focus correction lens executed in the processing shown in FIG. 3.

The microprocessor 116 determines in step S407 whether or not the position of the second focus correction lens 104 (the detection position by the second focus position sensor 120a) matches the target position decided by the processing shown in FIG. 6. If they do not match, the process advances to step S409, and the microprocessor 116 drives the second stepping motor 119a to move the second focus correction lens 104 to the target position, thus ending the processing. On the other hand, if it is determined that the position of the second focus correction lens 104 matches the target position, the process advances to step S408 to stop driving of the second stepping motor 119a, thus ending the processing.

The correction method of the first focus correction lens 105 will be described below.

Figure 8:
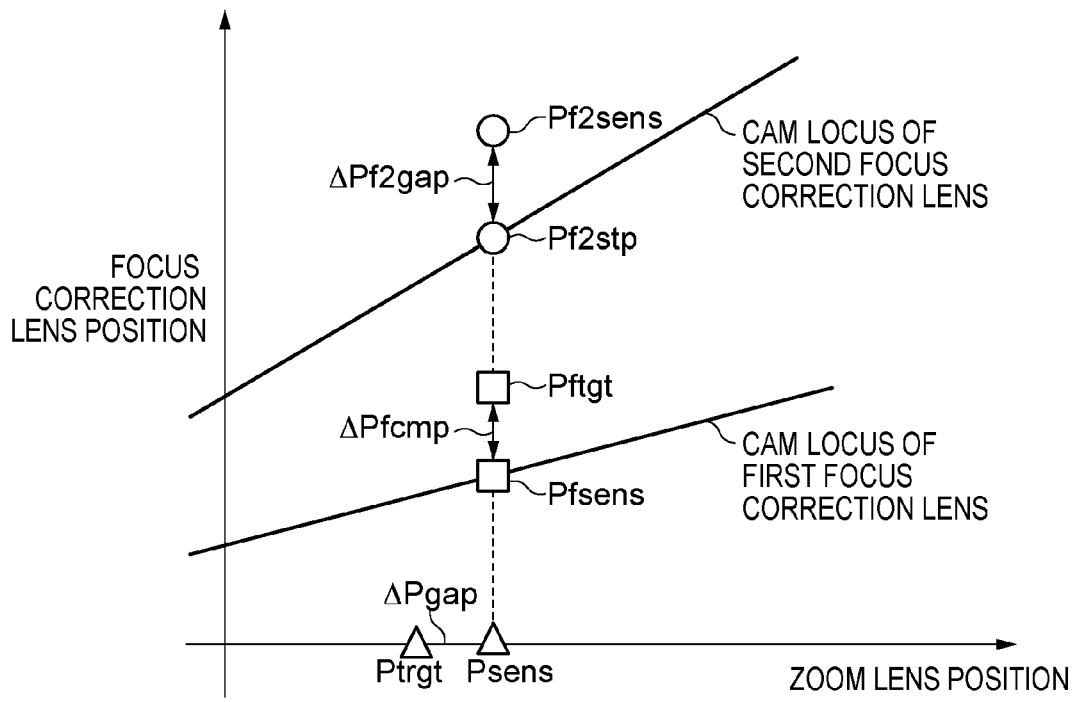
FIG. 8 is a graph showing a correction method of the first focus correction lens in a zoom stopped state.
Figure 9:
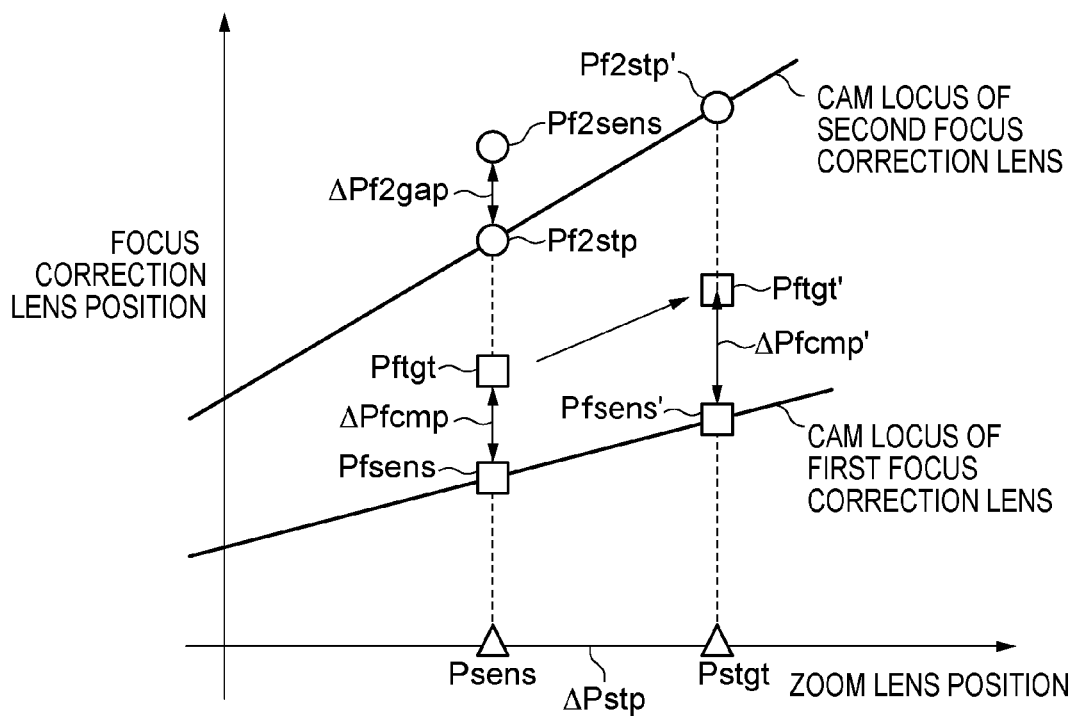
FIG. 9 is a graph showing a correction method of the first focus correction lens during zooming.

The driving control of the zoom lens 102, first focus correction lens 105, and second focus correction lens 104 during zooming and in a zoom stopped state, which is executed in step S306 and subsequent steps in FIG. 4, will be described in detail below with reference to FIGS. 8 and 9.

When the zoom lens 102 is stopped, the first and second focus correction lenses 105 and 104 are stopped on cam loci expressed by the first and second cam data, thus allowing to maintain an in-focus state. However, as described above, the stop position is deviated due to stop precisions of the motors. Hence, the present invention controls the zoom lens 102 and second focus correction lens 104 by open control. Then, the present invention is characterized in that feedback control is executed so that the first focus correction lens 105 is driven by a correction amount calculated using the correction coefficient K using the sensitivities to correct an image plane shift due to stop deviations of these lenses.

Correction in a zoom stopped state will be described first. Assume that the zoom lens 102 is stopped at the position Psens, and the second focus correction lens 104 is stopped at the position Pf2sens, as shown in FIG. 8. In this case, a deviation of the zoom lens 102 is expressed by a difference $\Delta$Pgap between the target driving position Ptrgt based on the pulse count of the first stepping motor 110a and the stop position Psens of the zoom lens 102. In this case, the deviation $\Delta$Pgap of the zoom lens 102 is corrected by setting Pfsens on the first cam data of the first focus correction lens 105 as the target position.

Next, a deviation of the second focus correction lens 104 is expressed by a difference $\Delta$Pf2gap between the target position Pf2stp based on the pulse count of the second stepping motor 119a and the position Pf2sens. A correction amount required to correct the deviation Pf2gap of the second focus correction lens 104 is expressed by $\Delta$Pfcmp multiplied by the correction coefficient K which is different depending on the zoom position. Hence, a defocus is corrected by controlling the first focus correction lens 105 to be moved by $\Delta$Pfcmp from the position Pfsens on the first cam data at a speed higher than a normal speed after zooming is stopped, and to finally reach the position Pftgt.

As described above, the deviations of the zoom lens 102 and second focus correction lens 104 can be corrected by the first focus correction lens 105.

A case will be described below with reference to FIG. 9 wherein zooming is started from a state in which the second focus correction lens 104 is stopped at the position Pf2sens. In this case, a deviation of the zoom lens 102 is expressed by a difference between the target driving position Ptrgt based on the pulse count of the first stepping motor 110a and the stop position Psens of the zoom lens 102. However, during zooming, the deviation of the zoom lens 102 is corrected by setting, as the target position, Pfsens' on the first cam data at the position Pstgt obtained by adding the target driving amount $\Delta$Pstp to the position Psens.

Next, a deviation of the second focus correction lens 104 is expressed by a difference $\Delta$Pf2gap between the target position Pf2stp of the second stepping motor 110a and the stop position Pf2sens of the second focus correction lens 104. A correction amount required to correct the stop deviation $\Delta$Pf2gap of the second focus correction lens 104 is expressed by $\Delta$Pfcmp multiplied by the correction coefficient K, which is different depending on the zoom position. Hence, during zooming, a point Pftgt moved from Pfsens on the first cam data by the correction amount $\Delta$Pfcmp according to the zoom position is set as the target position. That is, Pftgt' moved from the target position Pfsens' of the first focus correction lens by $\Delta$Pfcmp' is set as the target position of the first focus correction lens 105.

In this manner, even during zooming, the deviations of the zoom lens 102 and second focus correction lens 104 can be corrected by the first focus correction lens 105.

As described above, according to the first embodiment, even when a predicted driving amount does not match an actual moving amount of the lens due to backlashes of the driving mechanism and thread pitch variations, the following effects can be obtained. That is, by feeding back the position sensor information, the correction lens position can be moved to maintain an in-focus positional relationship even in lenses of the rear-focus lens type. Thus, an object image can be prevented from being defocused, and a high performance as the image capturing apparatus can be assured.

Furthermore, when a plurality of correction lenses are driven, all the motors other than that having a highest resolution are handled as an open control system, thus simplifying the driving control. Then, a focus correction driving amount is calculated from a deviation amount between a predicted driving amount of each open-controlled lens and an actual driving amount of that lens, and is corrected by a lens having the motor with the highest resolution (the first focus correction lens 105 in the first embodiment). In this manner, an in-focus state can be maintained. That is, even when the plurality of correction lenses are driven, a zoom operation that maintains an in-focus state can be attained, thus preventing a performance drop.

Second Embodiment

The second embodiment of the present invention will be described below. FIG. 10 is a block diagram showing an arrangement of a video camera as an example of an image capturing apparatus according to a second embodiment. Note that the same reference numerals in the arrangement shown in FIG. 10 denote the same parts as in FIG. 1, and a description thereof will not be repeated.

The video camera according to the second embodiment executes focus control by driving an image sensing element 106 unlike in the video camera of the first embodiment described with reference to FIG. 1. For this purpose, a second stepping motor 125a required to drive the image sensing element 106 in an optical axis direction, and a feed screw 124 and rack 106a which configure a driving mechanism are arranged. Furthermore, to the image sensing element 106, an image sensing element position sensor 123a and position scale 123b are added. Also, in FIG. 10, a second fixed lens 126 is inserted in place of a second focus correction lens 104 shown in FIG. 1, and a driving mechanism required to drive the second focus correction lens 104 in the optical axis direction, and a sensor mechanism required to detect the position of that lens are omitted.

In case of the first embodiment described with reference to FIG. 1, the second focus correction lens 104 and first focus correction lens 105 independently undergo driving control in the optical axis direction. By contrast, in the second embodiment, a zoom lens 102, a stop 103, and the second fixed lens 126 are joined via a cam ring, and are interlocked upon driving of the zoom lens 102. Unlike in the first embodiment in which the second focus correction lens 104 is driven in the optical axis direction, the image sensing element 106 is driven in the optical axis direction in the second embodiment.

In general, in order to attain a size reduction while maintaining a high zoom ratio in a zoom lens, refracting powers of lens groups need only be enhanced. However, in such zoom lens, aberrations at the time of zooming increase, and it becomes difficult to obtain a high optical performance. Hence, as shown in FIG. 10, the stop 103 and second fixed lens 126 are interlocked at certain ratios upon driving of the zoom lens 102, while a first fixed lens 101 is kept immovable, and the image sensing element 106 is driven, so that a optical length from the first fixed lens 101 to the image sensing element 106 is longer at the telephoto end than at the wide-angle end. Then, a compact image capturing apparatus having a wide angle of field and high zoom ratio can be realized.

The operation of the image sensing element 106 will be described in detail below. A microprocessor 116 drives the second stepping motor 125a via a second stepping motor driving circuit 125b so as to move the image sensing element 106 to a predetermined reference position upon, for example, power-ON of the video camera. This operation is called a sensor reset operation. The state that the image sensing element 106 is moved to the reference position can be detected by a reference position sensor (not shown). The reference position sensor is configured by, for example, a photointerrupter. In this case, a light shielding portion provided to the image sensing element 106 (a holding member which holds this element in practice) enters between a light-emitting unit and light-receiving unit of the photointerrupter, and the photointerrupter is switched from a light-receiving state to a light-shielded state. Thus, the state that the image sensing element 106 is moved to the reference position is detected.

After the sensor reset operation, the microprocessor 116 drives the second stepping motor 125a to move the image sensing element 106 to an imaging start position (in this case, an in-focus position at the wide-angle end; it may be an in-focus position at the telephone end). The number of driving pulses to be applied to the second stepping motor 125a to move the image sensing element 106 from the reference position to the in-focus position at the wide-angle end is stored in advance in a memory 117 included in the microprocessor 116.

The position scale 123b is formed with a scale pattern such as a magnetic pattern or light reflecting pattern which changes in the optical axis direction. When the image sensing element position sensor 123a reads a magnetic signal or optical signal which changes according to the scale pattern on the position scale 123b, the real position of the image sensing element 106 in the optical axis direction can be detected. A detection signal of the image sensing element position sensor 123a is input to the microprocessor 116, and is used in the driving control of the image sensing element 106 in a zooming operation.

The memory 117 stores three kinds of data required to correct an image plane shift upon zooming.

First, digital cam data (to be referred to as "first cam data" hereinafter) which indicates the position of the first focus correction lens 105 according to the position of the zoom lens 102 is stored for each predetermined object distance. This first cam data is also called zoom tracking data, and indicates positions (locus) where the first focus correction lens 105 is to be moved, so as to maintain an in-focus state, when the zoom lens 102 is moved by a zooming operation.

Next, digital cam data (to be referred to as "third cam data" hereinafter) indicating the position of the image sensing element 106, which is uniquely determined according to the position of the zoom lens 102, is stored. This third cam data indicates positions (locus) where the image sensing element 106 is to be moved, so as to maintain an in-focus state, when the zoom lens 102 is moved by a zooming operation.

Lastly, a reciprocal of a first sensitivity, which represents a shift amount of an image plane per unit moving amount of the first focus correction lens 105 according to the position of the zoom lens 102, is stored as second optical characteristic data. This second optical characteristic data is used to calculate an amount to be corrected of the first focus correction lens 105 to maintain an in-focus state when a deviation between a target driving amount and real position of the image sensing element is produced. Note that this calculation method will be described in detail later with reference to FIG. 14.

Zooming control in the video camera with the aforementioned arrangement will be described below with reference to the flowchart shown in FIG. 11. This zooming control is executed according to a computer program stored in the microprocessor 116. Upon driving of the zoom lens 102 in response to an operation of a zoom operation member 118, the stop 103 and second fixed lens 126, which are joined via the cam ring, are interlocked. However, for the sake of simplicity, only the movement of the zoom lens 102 will be described, and a description of the coordinated lenses will not be given.

Figure 3:
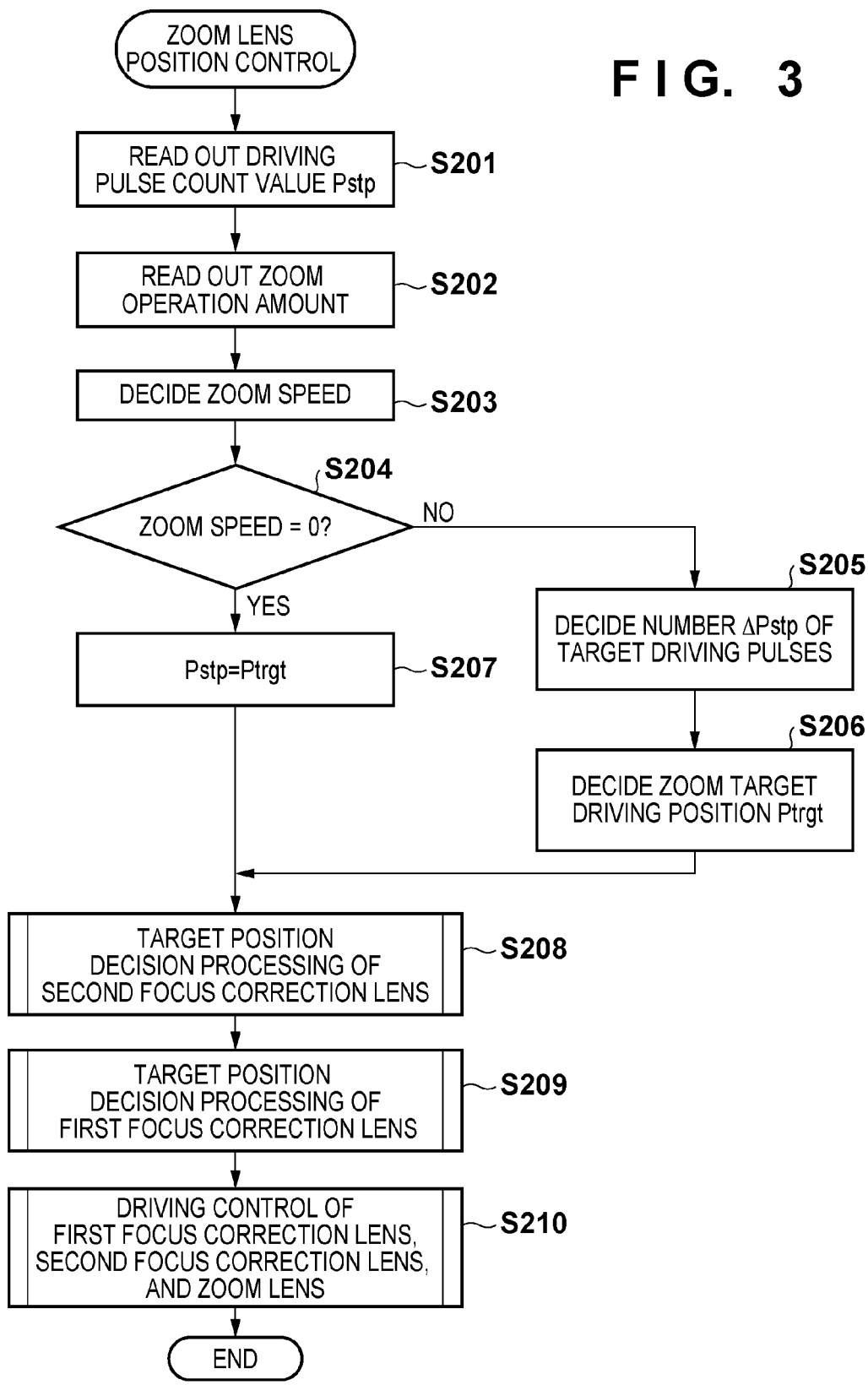
FIG. 3 is a flowchart showing zooming control according to the first embodiment.
Figure 11:
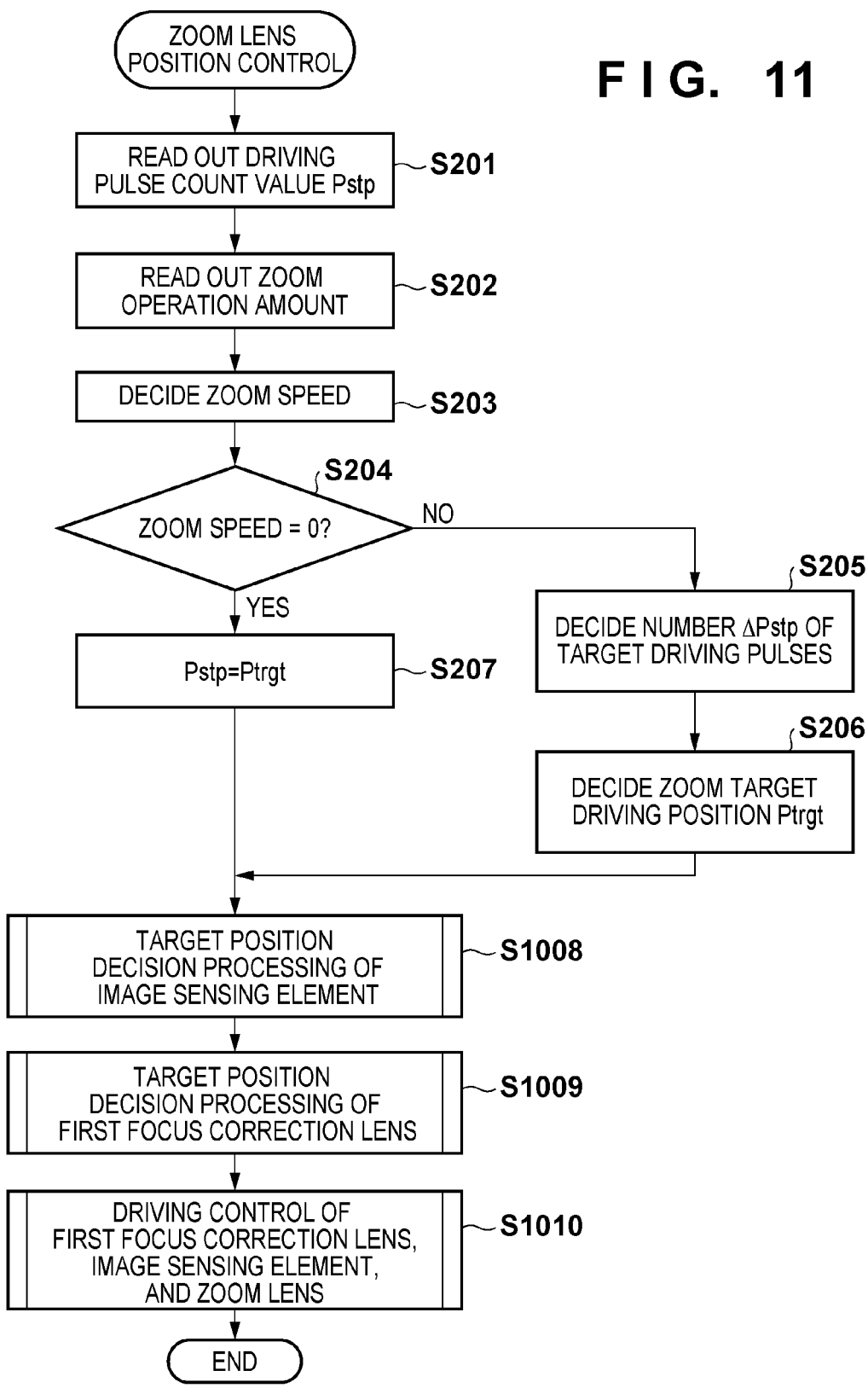
FIG. 11 is a flowchart showing zooming control according to the second embodiment.

In FIG. 11, processes in steps S201 to S207 are the same as those described using FIG. 3, and a description thereof will not be repeated.

In step S1008, the microprocessor 116 calculates a target position of the image sensing element 106 according to a target driving position Ptrgt of the zoom lens 102. In this case, using the third cam data stored in the memory 117, the target position of the image sensing element 106 can be uniquely decided according to the position of the zoom lens 102. The microprocessor 116 calculates the number of target driving pulses to be applied to the second stepping motor 125a required to drive the image sensing element 106 based on the calculated target position. Note that the target position decision processing executed in step S1008 will be described later with reference to FIG. 14.

In step S1009, the microprocessor 116 executes processing for deciding a target position of the first focus correction lens 105. This processing will be described later with reference to FIG. 12.

In step S1010, the microprocessor 116 drives a first stepping motor 110a toward the target driving position Ptrgt calculated in step S206. Furthermore, the microprocessor 116 drives the second stepping motor 125a to move the image sensing element 106 to the target position decided in step S1008. Moreover, the microprocessor 116 drives a focus motor to move the first focus correction lens 105 to the target position decided in step S1009. Note that when Pstp=Ptrgt in step S207, the image sensing element 106 and first focus correction lens 105 are not driven. Upon completion of driving of the respective lenses, the processing ends.

The decision processing of the target position of the image sensing element 106 executed in step S1008 in FIG. 11 will be described below with reference to the flowchart of FIG. 14.

In step S1301, the microprocessor 116 reads out a current driving pulse count value Pcstp of the second stepping motor 125a from an internal counter. Next, in step S1302, the microprocessor 116 reads out position detection data Psens of the zoom lens 102 from a zoom position sensor 114a, and stores it in the RAM.

In step S1303, the microprocessor 116 decides the target position to which the image sensing element 106 is to track using the moving target position of the zoom lens 102 and the third cam data. In this case, the drive pulse count value Pstp of the zoom lens 102 detected in step S201 is a relative zoom position obtained by adding the pulse count to the reference position, but it suffers errors caused by, for example, backlashes of the driving mechanism and thread pitch variations in practice. For this reason, the position indicated by the driving pulse count value Pstp obtained by adding or subtracting the pulse count to or from the reference position of the zoom lens 102 does not always match the position indicated by the position detection data Psens detected by the zoom position sensor 114a. Therefore, when an in-focus position to which a focus is to be tracked in practice is controlled based only on the driving pulse count value Pstp, a deviation is produced, and an object image is consequently kept defocused, resulting in a performance drop as the image capturing apparatus.

Hence, in step S1303, the microprocessor 116 adds the number ΔPstp of target driving pulses decided in step S205 to the position detection data Psens indicating the current position of the zoom lens 102 according to:

$$Pstgt = Psens + \Delta Pstp \qquad (1)$$

Then, the microprocessor 116 decides the obtained zoom position as a target position Pstgt of the zoom lens 102 used to track a focus, and stores it in the RAM.

In step S1304, the microprocessor 116 reads out the third cam data to be currently tracked. Using this third cam data, the position of the image sensing element 106, which is required to maintain a current in-focus state, and corresponds to the position of the zoom lens 102, can be calculated.

In step S1305, the microprocessor 116 decides the target position of the image sensing element 106. In this case, the microprocessor 116 decides the target position of the image sensing element 106 corresponding to the target position Pstgt of the zoom lens 102 using the third cam data stored in the memory. After the target position is decided, the process advances to step S1009.

The decision processing of the target position of the first focus correction lens 105 executed in step S1009 in FIG. 11 will be described below with reference to the flowchart of FIG. 12.

In step S1101, the microprocessor 116 reads out position detection data Pfsens of the first focus correction lens 105 from a first focus position sensor 115a, and stores it in the RAM. In step S1102, the microprocessor 116 reads out position detection data Pcsens of the image sensing element 106 from the image sensing element position sensor 123a, and stores it in the RAM. The microprocessor 116 reads out a current driving pulse count value Pcstp of the second stepping motor 125a from the internal counter. In the second embodiment, the stepping motor is used to drive the image sensing element 106, and the position to be detected in this case means not a pulse count value but an actual lens position.

In step S1103, the microprocessor 116 reads out the position detection data Psens of the zoom lens 102 from the zoom position sensor 114a, and stores it in the RAM.

In step S1104, the microprocessor 116 reads out the first cam data to be currently tracked. Using this first cam data, the position of the first focus correction lens 105, which is required to maintain a current in-focus state and corresponds to the position of the zoom lens 102, can be calculated.

In the subsequent processes, the microprocessor 116 decides the target position to which the first focus correction lens 105 is to track using the moving target position of the zoom lens 102 and the first cam data. In this case, the driving pulse count value Pstp of the zoom lens 102 detected in step S201 is a relative zoom position obtained by adding a pulse count to the reference position, and suffers errors caused by, for example, backlashes of the actual driving mechanism and thread pitch variations in practice. For this reason, the position indicated by the driving pulse count value Pstp obtained by adding or subtracting a pulse count to or from the reference position of the zoom lens 102 does not always match the position indicated by the position detection data Psens detected by the zoom position sensor 114a. Therefore, when an in-focus position to which a focus is to be tracked in practice is controlled based only on the driving pulse count value Pstp, a deviation is produced, and an object image is consequently kept defocused, resulting in a performance drop as the image capturing apparatus.

Hence, in step S1105, the microprocessor 116 adds the number ΔPstp of target driving pulses decided in step S205 to the position detection data Psens indicating the current position of the zoom lens 102 according to equation (1) above as in step S1303. Then, the microprocessor 116 decides the obtained zoom position as the target position Pstgt of the zoom lens 102 used to track a focus, and stores it in the RAM.

The microprocessor 116 then checks in step S1106 whether or not the first stepping motor 110a used to drive the zoom lens 102 is in a driving stopped state. If the first stepping motor 110a is being driven, the process advances to step S1107. In step S1107, the microprocessor 116 calculates a deviation ΔPcgap when the image sensing element 106 is stopped. The deviation ΔPcgap can be calculated from a difference between the driving pulse count value Pcstp and the position detection data Pcsens according to:

$$\Delta Pcgap = Pcstp - Pcsens \qquad (8)$$

In step S1108, the microprocessor 116 calculates a correction amount of the first focus correction lens 105, which is required to correct the deviation ΔPcgap of the image sensing element 106 calculated in step S1107 according to equation (9) to be described later. Note that this correction method is a characteristic feature of the present invention, and zoom driving is executed while correcting the deviation of the image sensing element 106 by the first focus correction lens 105 during zooming, thus contributing to improvement of a focusing performance during zooming. This method will be described in detail below. Note that correction amount calculation formulas are different from those of the first embodiment, since the image sensing element 106 is driven.

The correction method is characterized by using a sensitivity. The sensitivity is a change in image plane when a lens is moved by a predetermined amount. A focus correction amount ΔPfcmp of the first focus correction lens 105 due to the deviation of the image sensing element 106 is calculated by:

$$\Delta Pfcmp = \Delta Pcgap + \text{sensitivity of focus correction lens} \qquad (9)$$

In step S1109, the microprocessor 116 calculates a corresponding position of the first focus correction lens 105 corresponding to the target position Pstgt of the zoom lens 102 with reference to the first cam data stored in the memory 117. Letting Pfsens' be the corresponding position of the first focus correction lens 105, a target position Pftgt' of the first focus correction lens 105 can be decided as:

$$Pftgt' = Pfsens' + \Delta Pfcmp \qquad (6)$$

After the target position of the first focus correction lens 105 is decided, the process advances to step S1010.

On the other hand, if it is determined in step S1106 that the first stepping motor 110a used to drive the zoom lens 102 is in a driving stopped state, the process advances to step S1110. In this case, although the zoom lens 102 is stopped, the position detection data Psens of the zoom lens 102 does not always match the zoom target position Ptrgt, as described above, and the zoom lens 102 is stopped at a position having an error equal to or smaller than a threshold. On the other hand, in the processes executed so far, the focus target position is calculated as a position on the cam data corresponding to the zoom target position Ptrgt. For this reason, when the actual position of the zoom lens 102 does not match the zoom target position Ptrgt, it deviates from the cam data required to maintain an in-focus state. Especially, when the image capturing apparatus is in a manual focus mode, it does not perform any autofocus operation, and an object image is kept defocused by a deviation amount from the cam data, resulting in a performance drop as the image capturing apparatus. In order to prevent this, in step S1110, the microprocessor 116 calculates a focus target position corresponding to the position detection data Psens of the zoom lens 102 from the zoom position sensor 114a using the first cam data, and sets it as a target position of the first focus correction lens 105. Then, the process advances to step S1111.

In step S1111, for the same reason as above, the microprocessor 116 calculates a corresponding position of the image sensing element 106 corresponding to the position detection data Psens of the zoom lens 102 from the zoom position sensor 114a using the third cam data, and sets it as a target position of the image sensing element 106. Then, the process advances to step S1112.

In step S1112, the microprocessor 116 calculates the deviation ΔPcgap when the image sensing element 106 is stopped. The deviation ΔPcgap is calculated from a difference between the drive pulse count value Pcstp and position detection data Pcsens according to equation (8).

In step S1113, the microprocessor 116 calculates the correction amount ΔPfcmp of the first focus correction lens 105, which is required to correct the deviation ΔPcgap of the image sensing element 106 calculated in step S1112, according to equation (9) above. Note that this correction method is a third characteristic feature of the present invention. In a zoom stopped state, the deviations of the zoom lens 102 and image sensing element 106 are corrected by the first focus correction lens 105 after zooming is stopped, thus contributing to improvement of a focusing performance in a zoom stopped state.

In step S1114, the microprocessor 116 decides the target position Pftgt of the first focus correction lens 105 using the correction amount ΔPfcmp of the first focus correction lens 105 and the focus target position calculated in step S1110, which is assumed as Pfsens, according to equation (7) above.

In step S1115, the microprocessor 116 decides a target speed of the first focus correction lens 105 as in step S315 of FIG. 4. After the target speed is decided, the process advances to step S1010.

Figure 13:
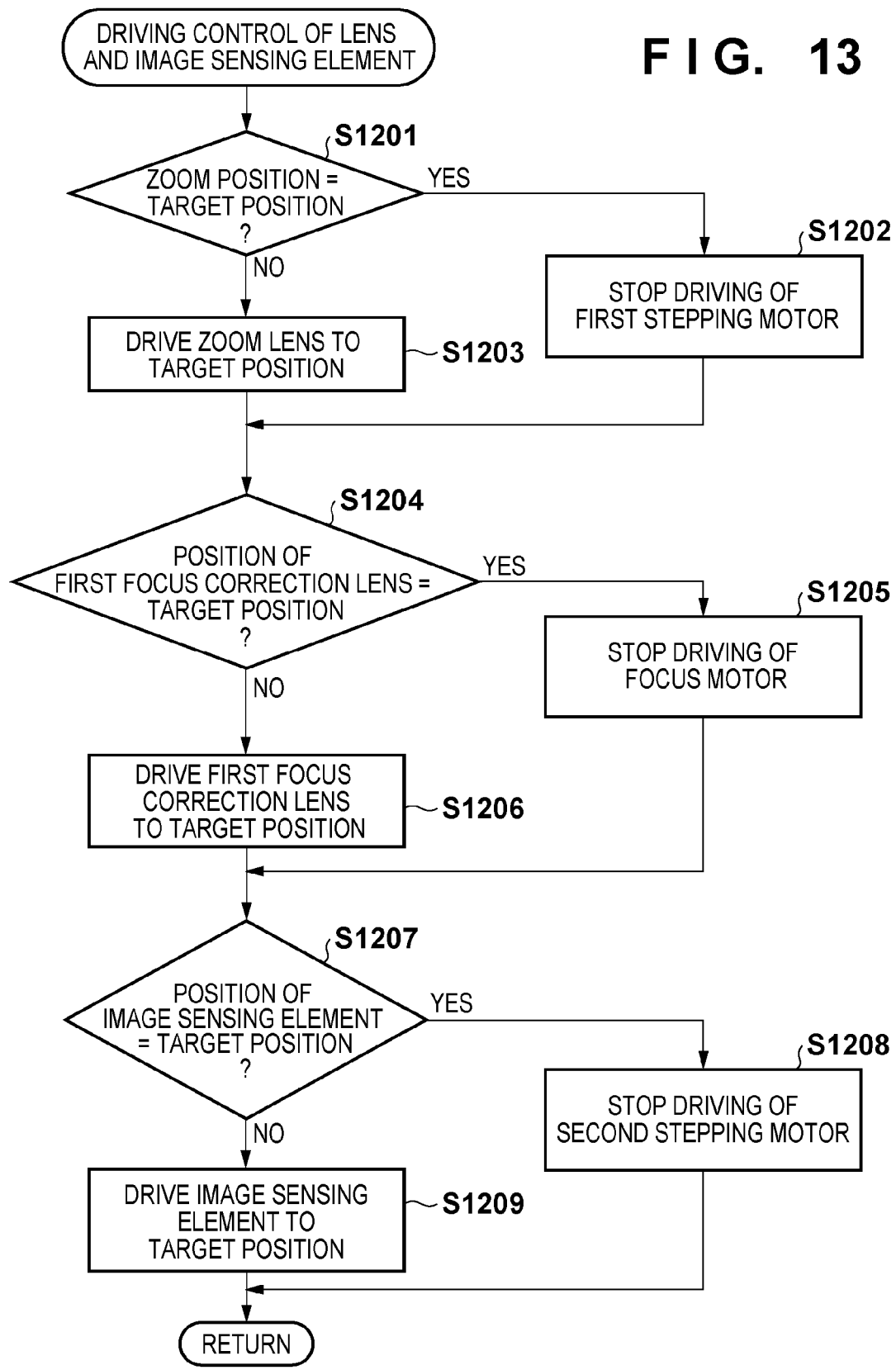
FIG. 13 is a flowchart showing position control of a zoom lens, focus correction lens, and image sensing element executed in the processing shown in FIG. 11.

The driving control of the zoom lens 102, first focus correction lens 105, and image sensing element 106, which is executed in step S1010 in FIG. 11, will be described below with reference to the flowchart of FIG. 13.

The microprocessor 116 determines in step S1201 whether or not the position of the zoom lens 102 matches the focus tracking zoom target position Pstgt. If they do not match, the process advances to step S1203, and the microprocessor 116 drives the first stepping motor 110a to move the zoom lens 102 to the focus tracking zoom target position Pstgt. Then, the process advances to step S1204. If the position of the zoom lens 102 matches the focus tracking zoom target position Pstgt, the process advances to step S1202 to stop driving of the first stepping motor 110a. Then, the process advances to step S1204.

Figure 12:
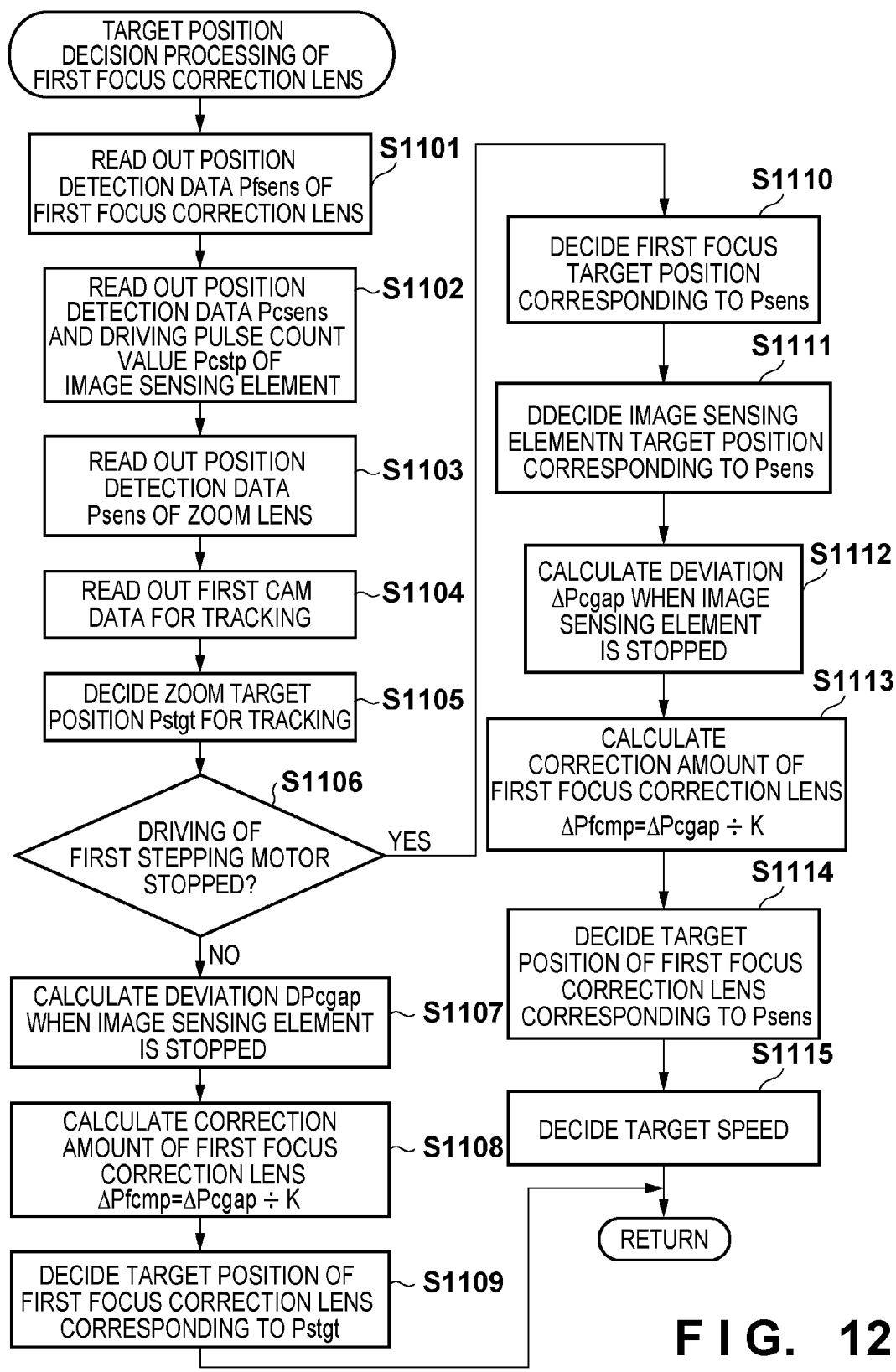
FIG. 12 is a flowchart showing details of target position decision processing of a first focus correction lens executed in the processing shown in FIG. 11.

The microprocessor 116 determines in step S1204 whether or not the position of the first focus correction lens 105 (the detection position by the first focus position sensor 115a) matches the target position decided by the processing shown in FIG. 12. If they do not match, the process advances to step S1206, and the microprocessor 116 drives the focus motor to move the first focus correction lens 105 to the target position. Then, the process advances to step S1207. On the other hand, if it is determined that the position of the first focus correction lens 105 matches the target position, the process advances to step S1205 to stop driving of the focus motor. Then, the process advances to step S1207.

Figure 14:
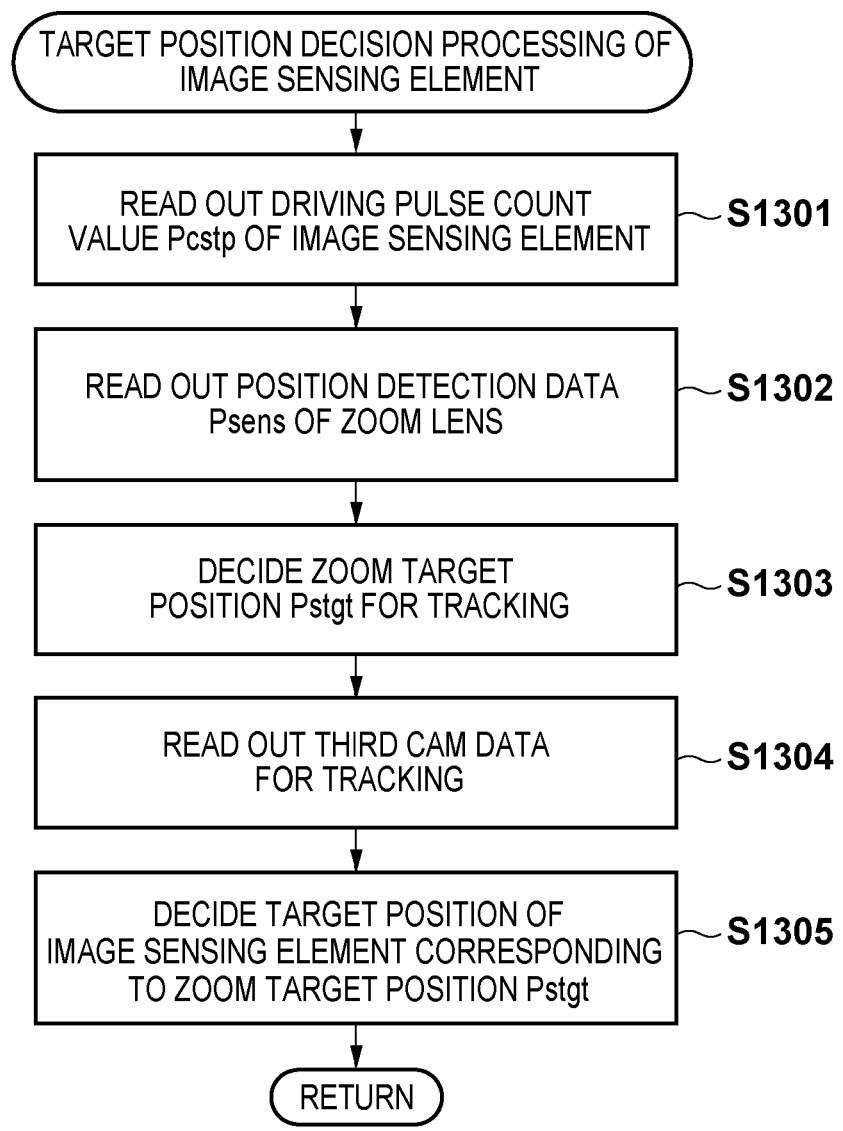
FIG. 14 is a flowchart showing details of target position decision processing of the image sensing element executed in the processing shown in FIG. 11.

The microprocessor 116 determines in step S1207 whether or not the position of the image sensing element 106 (the detection position by the image sensing element position sensor 123a) matches the target position decided by the processing shown in FIG. 14. If they do not match, the process advances to step S1209, and the microprocessor 116 drives the second stepping motor 125a to move the image sensing element 106 to the target position, thus ending the processing. On the other hand, if it is determined that the position of the image sensing element 106 matches the target position, the process advances to step S1208 to stop driving of the second stepping motor 125a, thus ending the processing.

As described above, according to the second embodiment, when focus correction is attained by driving the image sensing element 106 in place of the second focus correction lens 104, the same effects as those in the aforementioned first embodiment can be obtained.

Note that the first and second embodiments have explained the case in which the zoom lens driving mechanism using the feed screw and rack is included. Alternatively, another driving mechanism using a gear train may be used in place of that using the feed screw and rack.

As described above, the second embodiment has explained the case in which focus correction is attained by driving the image sensing element 106. Alternatively, an arrangement which moves a stop mechanism or another optical element in the optical axis direction may be adopted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-192918, filed on Aug. 30, 2010 and 2011-137740, filed Jun. 21, 2011, which are hereby incorporated by reference herein in their entirety.

What is claimed is:

1. An image capturing apparatus comprising:
a zoom lens which is driven in an optical axis direction;
a correction lens capable of being driven in the optical axis direction;
an image sensing unit configured to photoelectrically convert incident light, and output an electric signal, the image sensing unit capable of being driven in the optical axis direction;
a storage unit configured to store data on positional relationships between the zoom lens, and the correction lens and the image sensing unit which are required to correct a shift of an image plane upon driving of the zoom lens for each predetermined focal length;
a first position detection unit configured to detect a position of the zoom lens;
a second position detection unit configured to detect a position of the image sensing unit; and
a control unit configured to control driving of the correction lens and the image sensing unit,
wherein the control unit calculates target positions of the correction lens and the image sensing unit by using a position of the zoom lens detected by the first position detection unit and the data stored in the storage unit, and wherein when the zoom lens is moved, the control unit calculates a correction amount of the correction lens required to correct an image plane position difference caused by a difference between a position of the image sensing unit based on the target position of the image sensing unit and a position of the image sensing unit detected by the second position detection unit, and controls driving of the correction lens by using the correction amount.

2. The image capturing apparatus according to claim 1 further comprising:
a first driving unit configured to drive the correction lens; and
a second driving unit configured to drive the image sensing unit,
wherein the first driving unit has a higher resolution than that of the second driving unit.

3. The image capturing apparatus according to claim 1,
wherein when the zoom lens is moved, the control unit controls driving of the correction lens by calculating the target position of the correction lens based on a position of the correction lens corresponding to the position of the zoom lens detected by the first position detection unit according to the data stored in the storage unit, and the correction amount.

4. The image capturing apparatus according to claim 1, wherein the control unit sets a driving speed of the correction lens when the zoom lens is stopped to be higher than a driving speed when the zoom lens is moved.

5. A control method of an image capturing apparatus which comprises a zoom lens which is driven in an optical axis direction, a correction lens capable of being driven in the optical axis direction, an image sensing unit configured to photoelectrically convert incident light, and output an electric signal, the image sensing unit capable of being driven in the optical axis direction, and a storage unit configured to store data on positional relationships between the zoom lens, and the correction lens and the image sensing unit which are required to correct a shift of an image plane upon driving of the zoom lens for each predetermined focal length, the method comprising:
a first position detection step of detecting a position of the zoom lens;
a second position detection step of detecting a position of the image sensing unit; and
a control step of controlling driving of the correction lens and the image sensing unit,
wherein the control step calculates target positions of the correction lens and the image sensing unit by using a position of the zoom lens detected in the first position detection step and the data stored in the storage unit, and
wherein when the zoom lens is moved, the control step calculates a correction amount of the correction lens required to correct an image plane position difference caused by a difference between a position of the image sensing unit based on the target position of the image sensing unit and a position of the image sensing unit detected in the second position detection step, and controls driving of the correction lens by using the correction amount.

* * * * *